United States Patent
Shcheglov et al.

(10) Patent No.: US 7,437,253 B2
(45) Date of Patent: Oct. 14, 2008

(54) PARAMETRICALLY DISCIPLINED OPERATION OF A VIBRATORY GYROSCOPE

(75) Inventors: Kirill V. Shcheglov, Los Angeles, CA (US); Ken J. Hayworth, Northridge, CA (US); A. Dorian Challoner, Manhattan Beach, CA (US); Chris S. Peay, Alhambra, CA (US)

(73) Assignees: The Boeing Company, Chicago, IL (US); California Institute of Technology, Pasadena, CA (US)

( * ) Notice: Subject to any disclaimer, the term of this patent is extended or adjusted under 35 U.S.C. 154(b) by 448 days.

(21) Appl. No.: 11/192,759

(22) Filed: Jul. 29, 2005

(65) Prior Publication Data

US 2006/0037417 A1    Feb. 23, 2006

Related U.S. Application Data

(60) Provisional application No. 60/592,589, filed on Jul. 29, 2004.

(51) Int. Cl.
*G01R 23/00* (2006.01)
(52) U.S. Cl. .................. 702/75; 29/596; 73/504.13
(58) Field of Classification Search .............. 702/75, 702/94; 73/504.02, 504.04, 504.12, 504.13, 73/504.32; 333/186, 262; 74/5.4; 29/595
See application file for complete search history.

(56) References Cited

U.S. PATENT DOCUMENTS

| | | | |
|---|---|---|---|
| 392,650 A | 11/1888 | Watrous | |
| 4,898,031 A | 2/1990 | Oikawa et al. | |
| 5,203,208 A | 4/1993 | Bernstein | |
| 5,226,321 A | 7/1993 | Varnham et al. | |
| 5,421,312 A | 6/1995 | Dawson | |

(Continued)

FOREIGN PATENT DOCUMENTS

DE     44 42 033 A1    5/1996

(Continued)

OTHER PUBLICATIONS

Wright et al., "The HRG Applied to a Satellite Attitude Reference System," Guidance and Control, AASAAS, 1994, 86:1-13.

(Continued)

*Primary Examiner*—John H Le
(74) *Attorney, Agent, or Firm*—Bradley K. Lortz; Canady & Lortz LLP

(57) ABSTRACT

Parametrically disciplined operation of a symmetric nearly degenerate mode vibratory gyroscope is disclosed. A parametrically-disciplined inertial wave gyroscope having a natural oscillation frequency in the neighborhood of a sub-harmonic of an external stable clock reference is produced by driving an electrostatic bias electrode at approximately twice this sub-harmonic frequency to achieve disciplined frequency and phase operation of the resonator. A nearly symmetric parametrically-disciplined inertial wave gyroscope that can oscillate in any transverse direction and has more than one bias electrostatic electrode that can be independently driven at twice its oscillation frequency at an amplitude and phase that disciplines its damping to zero in any vibration direction. In addition, operation of a parametrically-disciplined inertial wave gyroscope is taught in which the precession rate of the driven vibration pattern is digitally disciplined to a prescribed non-zero reference value.

19 Claims, 19 Drawing Sheets

U.S. PATENT DOCUMENTS

| | | | |
|---|---|---|---|
| 5,578,976 | A | 11/1996 | Yao et al. |
| 5,646,346 | A | 7/1997 | Okada |
| 5,665,915 | A | 9/1997 | Kobayashi et al. |
| 5,728,936 | A | 3/1998 | Lutz |
| 5,783,749 | A | 7/1998 | Lee et al. |
| 5,894,090 | A | 4/1999 | Tang et al. |
| 5,905,202 | A | 5/1999 | Kubena et al. |
| 5,920,012 | A | 7/1999 | Pinson |
| 5,987,985 | A | 11/1999 | Okada |
| 6,009,751 | A | 1/2000 | Ljung |
| 6,044,705 | A | 4/2000 | Neukermans et al. |
| 6,145,380 | A | 11/2000 | Macgugan et al. |
| 6,151,964 | A | 11/2000 | Nakajima |
| 6,164,134 | A | 12/2000 | Cargille |
| 6,182,352 | B1 | 2/2001 | Deschenes et al. |
| 6,263,552 | B1 | 7/2001 | Takeuchi et al. |
| 6,282,958 | B1 | 9/2001 | Fell et al. |
| 6,289,733 | B1 | 9/2001 | Challoner et al. |
| 6,367,786 | B1 | 4/2002 | Gutierrez et al. |
| 6,481,284 | B2 | 11/2002 | Geen et al. |
| 6,481,285 | B1 | 11/2002 | Shkel et al. |
| 6,515,278 | B2 | 2/2003 | Wine et al. |
| 6,629,460 | B2 | 10/2003 | Challoner |
| 6,944,931 | B2 * | 9/2005 | Shcheglov et al. ............ 29/595 |
| 6,978,674 | B2 * | 12/2005 | Fell et al. ................. 73/504.13 |
| 2002/0066317 | A1 | 6/2002 | Lin |
| 2003/0010123 | A1 | 1/2003 | Malvern et al. |
| 2003/0029238 | A1 | 2/2003 | Challoner |
| 2004/0055380 | A1 | 3/2004 | Shcheglov et al. |

FOREIGN PATENT DOCUMENTS

| | | |
|---|---|---|
| DE | 19719601 A1 | 11/1998 |
| EP | 1055908 A1 | 11/2000 |
| EP | 0 971 208 A2 | 12/2000 |
| JP | 01129517 A | 5/1989 |
| WO | 0 461 761 A1 | 12/1991 |
| WO | WO 96/38710 | 12/1996 |
| WO | WO 98/15799 | 4/1998 |
| WO | WO 00/68640 | 11/2000 |
| WO | WO 01/44823 A | 6/2001 |
| WO | WO 01/74708 A | 10/2001 |

OTHER PUBLICATIONS

Putty et al., "A Micromachined Vibrating Ring Gyroscope," Solid State Sensor and Actuator Workshop, Transducer Research Foundation, Hilton Head, 1994, pp. 213-220.

Tang et al., "A Packaged Silicon MEMS Vibratory Gyroscope for Microspacecraft," Proceedings IEEE, 10th Annual Int. Workshop on MEMS, Japan, 1997, pp. 500-505.

Barbour et al., "Micromechanical Silicon Instrument and Systems Development at Draper Laboratory," AIAA Guidance Navigation and Control Conference, 1996, Paper No. 96-3709.

Johnson et al., "Surface Micromachined Angular Rate Sensor," A1995 SAE Conference, Paper No. 950538, pp. 77-83.

Fujita et al., "Disk-shaped bulk micromachined gyroscope with vacuum sealing," Sensors and Actuators A:Physical, vol. 82, May 2000, pp. 198-204.

Skulski et al., "Planar resonator sensor for moisture measurements", Microwaves and Radar, 1998, MIKON '98, 12th International Conf., vol. 3, May 20-22, 1998, pp. 692-695.

* cited by examiner

Case Oriented Drift Due to Asymmetric Damping

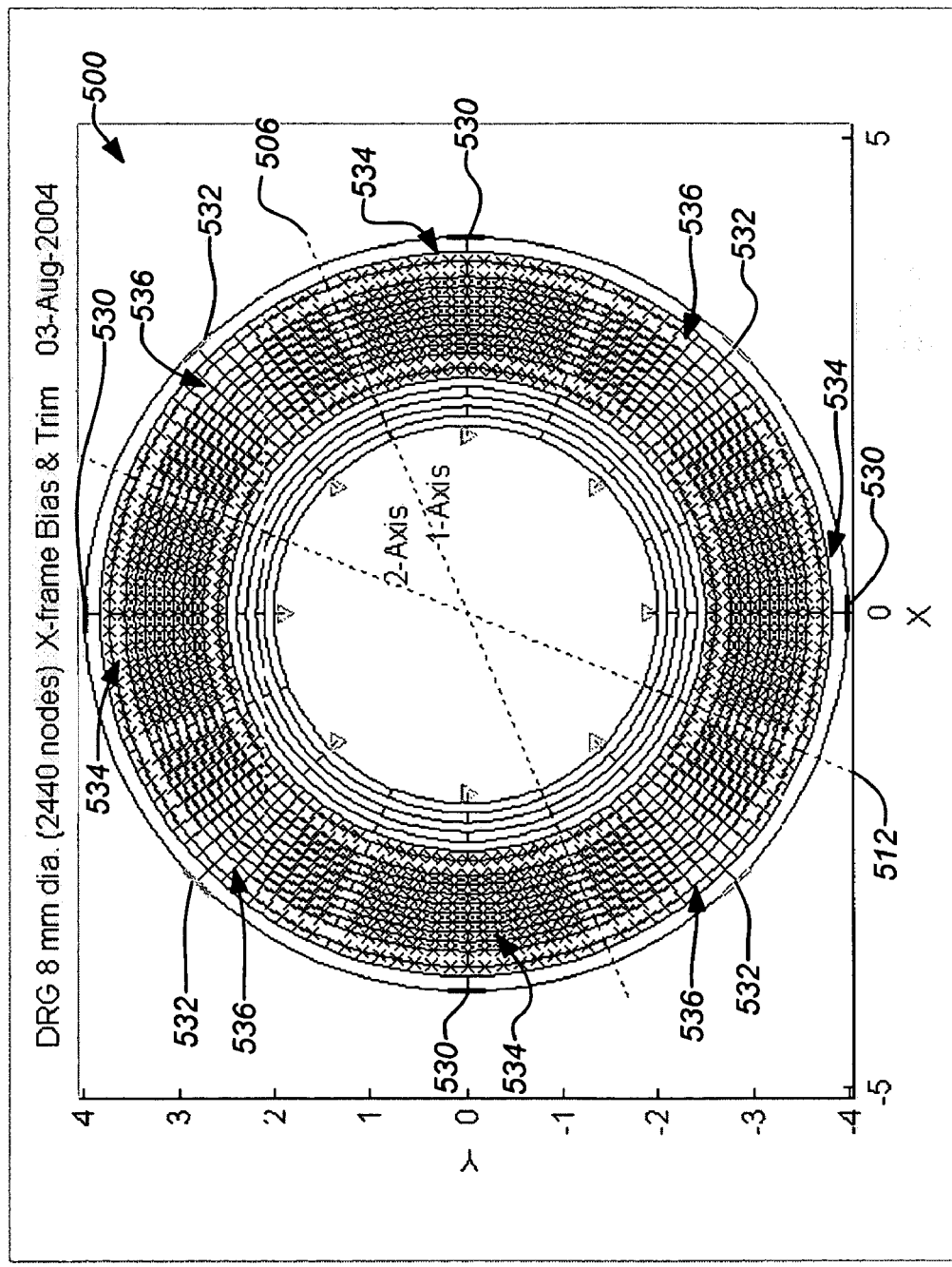

PARAMETRICALLY DISCIPLINED OPERATION OF A VIBRATORY GYROSCOPE

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 60/592,589, filed Jul. 29, 2004, and entitled "PARAMETRICALLY DISCIPLINED SYMMETRIC NEARLY DEGENERATE MODE VIBRATORY GYROSCOPE", by Shcheglov et al.

This application is related to the following patent applications, which are all incorporated by reference herein:

U.S. patent application Ser. No. 10/639,134, by Shcheglov et al., filed Aug. 12, 2003, and entitled "ISOLATED PLANAR GYROSCOPE WITH INTERNAL RADIAL SENSING AND ACTUATION," which claims priority to U.S. Provisional Patent Application No. 60/402,681, filed Aug. 12, 2002, and entitled "CYLINDER GYROSCOPE WITH INTEGRAL SENSING AND ACTUATION", by Shcheglov et al. and U.S. Provisional Patent Application No. 60/428,451, filed Nov. 22, 2002, and entitled "DESIGN AND FABRICATION PROCESS FOR A NOVEL HIGH PERFORMANCE MESOGYRO", by Shcheglov et al.

U.S. patent application Ser. No. 10/639,135, by Shcheglov et al., filed Aug. 12, 2003, and entitled "INTEGRAL RESONATOR GYROSCOPE" which claims priority to U.S. Provisional Patent Application No. 60/402,681, filed Aug. 12, 2002, and entitled "CYLINDER GYROSCOPE WITH INTEGRAL SENSING AND ACTUATION", by Shcheglov et al. and U.S. Provisional Patent Application No. 60/428,451, filed Nov. 22, 2002, and entitled "DESIGN AND FABRICATION PROCESS FOR A NOVEL HIGH PERFORMANCE MESOGYRO", by Shcheglov et al.; and U.S. patent application Ser. No. 11/103,899, by Challoner et al., filed Apr. 12, 2005, and entitled "ISOLATED PLANAR MESOGYROSCOPE," which claims priority to U.S. Provisional Patent Application No. 60/561,323, filed Apr. 12, 2004, by Challoner et al., entitled "MESOGYROSCOPE,"

U.S. Utility patent application Ser. No. 10/405,178, by Challoner, filed Apr. 2, 2003, entitled "ISOLATED RESONATOR GYROSCOPE," which is a continuation of parent U.S. Pat. No. 6,629,460, issued Oct. 7, 2003, by Challoner, entitled "ISOLATED RESONATOR GYROSCOPE,"

U.S. Utility patent application Ser. No. 10/370,953, by Challoner et al., filed Feb. 20, 2003, entitled "ISOLATED RESONATOR GYROSCOPE WITH A DRIVE AND SENSE FRAME,"

U.S. Utility patent application Ser. No. 10/423,459, by Challoner et al., filed Apr. 25, 2003, entitled "ISOLATED RESONATOR GYROSCOPE WITH ISOLATION TRIMMING USING A SECONDARY ELEMENT,"; and U.S. Utility patent application Ser. No. 10/410,744 by Challoner et al., filed Apr. 10, 2003, entitled "ISOLATED RESONATOR GYROSCOPE WITH COMPACT FLEXURES,"

This application is related to the following U.S. patents, which are incorporated by reference herein:

U.S. Pat. No. 6,698,287, by Kubena et al., issued Mar. 2, 2004, entitled "MICROGYRO TUNING USING FOCUSED ION BEAMS"; and U.S. Pat. No. 6,915,215, by M'Closkey et al., issued Jul. 5, 2005, entitled "INTEGRATED LOW POWER DIGITAL GYRO CONTROL ELECTRONICS".

STATEMENT OF GOVERNMENT RIGHTS

The invention described herein was made in the performance of work under NASA contract NAS 7-1402, and is subject to the provisions of Public Law 96-517 (35 U.S.C. 202) in which the Contractor has elected to retain title.

BACKGROUND OF THE INVENTION

1. Field of the Invention

The present invention relates to microgyroscopes, and in particular to vibratory microgyroscopes. More particularly, this invention relates to techniques for operating nearly-symmetric microgyroscopes or inertial wave microgyroscopes.

2. Description of the Related Art

Micromachining has brought compact, low-cost, low-power vibratory gyroscopes for safety and global positioning system (GPS)-aided navigation applications. However, their performance so far has been unsatisfactory for inertial positioning, pointing or autonomous navigation.

Symmetric degenerate mode vibratory gyroscopes present definite advantages for inertial navigation applications. They have been demonstrated to be capable of high performance and enable improved manufacturability and low cost when properly designed. The challenge of delivering high performance lies in achieving very high and closely-matched resonator Q's for both degenerate modes. This goal has been difficult to achieve for small devices capable of being mass produced.

In the late 1800's G. H. Bryan first identified the opportunity for a vibratory gyroscope based on ideal inertial wave operation. He understood that in a rotating, axisymmetric elastic continuum, a transverse traveling wave could be excited to propagate analogous to the inertial waves. This also applied in a rotating axisymmetric fluid continuum. Both waves were a balance between dynamic inertial, or Coriolis forces and elastic or pressure gradient forces. Both transverse waves propagated or precessed in the rotating frame at a precise fraction, k, of the inertial rate. The fraction, k, or angular gian is determined only by the geometric shape of the continuum, not the dimensions. Further, he identified the hemispherical shape as having a Coriolis-coupled vibratory mode with useful finite angular gain k=0.3 and deduced that it could be readily used to determine an inertial rate of rotation, $\Omega$, by simply measuring the inertial wave precession rate, $\Omega_p$, and dividing by k, i.e. $\Omega=\Omega_p/k$. Typically modal electrical phase, $\Omega_{pm}=n\Omega_p$ is measured rather than the actual mechanical precession phase and for a hemisphere, cylinder or disc shape, the Coriolis-coupled vibratory mode with n=2 is often selected. The extreme stability of the shape (sub parts per million), and hence the rate scale factor, has not yet been achieved in practice by any vibratory gyroscope even today.

Limitations in design, fabricated mechanical precision and quality and subsequent electronics operation have further resulted in high drift and noise that hinder the achievement of ideal inertial wave-based operation and performance. Ideally, a vibratory gyroscope should have drift and noise limited only by random physical noise i.e., thermal mechanical noise and/or random white electronics sensor noise in the very narrow vicinity of the resonator frequency. Such random physical noise can be mitigated using higher mechanical Q, mass and vibration amplitudes and higher capacitive sense area to maximize signal to electronics noise and sensitive electronics circuits. Current vibratory gyroscopes can generally be placed in two classes, asymmetric designs with a closed loop drive and un-tuned open-loop output, e.g. a tuning fork type, and axisymmetric designs with a closed loop drive and tuned closed loop output, e.g. a hemisphere, ring, or cylinder.

Conventionally-machined gyroscopes suitable for inertial wave operation such as the quartz hemispherical resonator gyroscope (HRG) have an ideal axisymmetric design, finite angular gain, k=0.3, with near-ideal mechanical fabrication precision and quality, but are not compact, low-cost and low-power. Furthermore, the HRG electronics operation limits performance. Several key parameters of the vibratory modal motion are not disciplined, e.g., resonator frequency and damping non-uniformity, leading to rate drift over temperature and are permitted to naturally vary with time or temperature or free-run. In some vibratory gyroscope designs the difference in the natural frequencies of the two resonator modes are controlled to zero or disciplined by driving output quadrature voltage to zero by modification of electrostatic biases to modify electrostatic stiffness, (quadrature nulling) or by feedback of the modal motion position states. Failure to discipline all parameters necessitates expensive calibration of the final rate output bias over temperature and case-orientation of the vibration pattern due to changes in the undisciplined parameters. Resonator state feedback is used to track the natural drive frequency and phase and control the amplitude using an automatic gain control (AGC) loop and sometimes the output axis in a force-to-rebalance loop. Sometimes drive frequency and phase is tracked with a phase-lock loop. Further, the output disturbance noise of the closed loop electronics of the HRG design is limiting noise and drift performance. A type of inertial wave operation (i.e., 'whole-angle' or 'rate-integrating') has been used with the HRG, however the natural frequency and natural damping unbalance are still allowed to freely change with temperature and time. Case-fixed closed loop operation or free-precession operation of the HRG, at very low inertial rates, does not offer the opportunity to completely identify changes in the stiffness and damping parameters of motion in all directions.

On the other hand, micromachined gyroscopes, with less ideal designs, mechanical precision and quality, suffer similar performance limitations, but to a much larger degree. Some of these designs, e.g., ring resonators, have employed a type of inertial wave operation for very high rate applications, but lack navigation grade sensitivity at very low input rates.

The result of this state of the art is that, as improved micromachined designs are advanced with improving mechanical precision and quality, the potential performance of inertial wave operation with low noise and drift corrected to the limits of the physical mechanical and sensor noise has not been achieved. This is due to the failure to complete the parametric discipline of a nearly-ideal inertial wave gyroscope.

In particular, the resonator frequency parameter and the non-uniform damping parameters have not before been disciplined in the operation of current small vibratory gyroscopes. In addition, the use of state-feedback in the prior art limits the performance of current gyroscope designs. Furthermore, digital electronics in a closed loop control consume additional power as sample frequency and computational precision are increased to improve accuracy and dynamic range.

In view of the foregoing, there is a need in the art for gyroscopes, particularly small vibratory gyroscopes such as an inertial wave gyroscope, and their methods of operation to have improved performance (e.g., higher and more closely matched Q, lower drift and lower noise) for navigation and/or spacecraft payload pointing. There is a need for such gyroscopes to operate under disciplined control of frequency and/or damping. There is also a need for gyroscope control electronics to operate with reduced power and computational requirements. As detailed hereafter, the present invention satisfies these and other needs.

SUMMARY OF THE INVENTION

Embodiments of the present invention adapt the principle of parametric driving of oscillators to the operation of a microgyroscope to facilitate complete discipline of the parameters of motion, improve performance and other characteristics. Parametric driving, where the resonator spring constant is modulated at twice the resonant frequency, applied to embodiments of the present invention employs a substantially fixed external frequency reference to discipline the microgyro resonator. In addition, embodiments of the invention may uniformly null effective damping of motion at all case orientations through further parametrically disciplined operation of the microgyroscope.

Parametrically disciplined operation of a symmetric nearly degenerate mode vibratory gyroscope is disclosed. A parametrically-disciplined inertial wave gyroscope having a natural oscillation frequency in the neighborhood of a sub-harmonic of an external stable clock reference is produced by driving an electrostatic bias electrode at approximately twice this sub-harmonic frequency to achieve disciplined frequency and phase operation of the resonator. A nearly symmetric inertial wave gyroscope is parametrically-disciplined so that it can oscillate in any transverse direction and has more than one bias electrostatic electrode that can be independently driven at twice its oscillation frequency at an amplitude and phase that disciplines its frequency to the driven frequency and the damping to zero in any vibration direction. In addition, operation of a parametrically-disciplined inertial wave gyroscope is taught in which the precession rate of the driven vibration pattern is digitally disciplined to a prescribed non-zero reference value.

A typical embodiment of the invention comprises a method of operating a gyroscope including generating a substantially fixed frequency, driving at least a first portion of a plurality of electrostatic electrodes to excite a resonator at the substantially fixed frequency and sensing rotation of the resonator through a response from at least a second portion of the plurality of electrostatic electrodes. The substantially fixed frequency is substantially two times a natural oscillation frequency of the resonator. Operation of the gyroscope may be self-disciplined requiring no digital discipline of the substantially fixed frequency. Alternately, the gyroscope may be digitally disciplined by comparing phase from a digital reference model referenced to the substantially fixed frequency signal and adjusting a bias voltage on the resonator to substantially eliminate any phase error. In some embodiments, the resonator can oscillate in any transverse direction and driving the first portion of the plurality of electrostatic electrodes to excite the resonator at the substantially fixed frequency comprises adjusting amplitude and phase to eliminate effective damping of the resonator pattern in any case direction.

In one exemplary embodiment, the resonator comprises an inertial wave resonator and the first portion of the plurality of electrostatic electrodes excite a standing wave vibration pattern in the inertial wave resonator and the response sensed from the second portion of the plurality of electrostatic electrodes is from movement of the standing wave or traveling wave vibration pattern. Typically, the inertial wave resonator comprises a disc resonator. The response may comprise a precession rate of the standing wave vibration pattern. The precession rate of the standing wave vibration pattern may be digitally disciplined to a prescribed non-zero reference value.

Furthermore, digitally disciplining the precession rate of the standing wave vibration pattern to the prescribed non-zero reference value may be accomplished by generating predicted sense sinusoidal components from with a digital model comprising an estimated inertial rate parameter and non-zero forcer sinusoidal component parameters to produce the prescribed non-zero reference value as the precession rate of the standing wave vibration pattern, applying the non-zero forcer sinusoidal component parameters from the digital model to at least a third portion of the plurality of electrodes, measuring sense component signals from at least a fourth portion of the plurality of electrodes, comparing the predicted sense sinusoidal components with the measured sense component signals to produce a prediction error, and updating the digital model with the prediction error to yield updates for all of the models estimated parameters including an updated inertial rate parameter. The prediction error may be filtered with a least mean squares (LMS) filter before updating the digital model.

In addition, a typical gyroscope controller embodiment of the invention includes a stable oscillator for generating a substantially fixed frequency signal, a driving circuit for driving at least a first portion of a plurality of electrostatic electrodes to excite a resonator at the substantially fixed frequency and a fixed reference amplitude and a sensing circuit for sensing rotation of the resonator through a response from at least a second portion of the plurality of electrostatic electrodes. The frequency is substantially two times a natural oscillation frequency of the resonator. The gyroscope controller may be further modified consistent with the method embodiments described above.

BRIEF DESCRIPTION OF THE DRAWINGS

Referring now to the drawings in which like reference numbers represent corresponding elements throughout:

FIG. 5C shows the finite element analysis model with X-frame bias and trim adjacent electrostatic bias electrodes and mechanical trim locations.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1.0 Overview

As mentioned above, G. H. Bryan was the first to identify the existence of a traveling elastic inertial wave in a rotating axisymmetric shell and that it always traveled at a precise geometrically determined fraction of the inertial rotation rate, $\Omega$. In a hemisphere for example, the inertial wave travels in a retrograde direction at $0.3\Omega$ for a rotating observer. As the art of micromachining has advanced and the precision and mechanical quality of the resulting structures has improved it is presently possible to fabricate a nearly-ideal inertial wave gyroscope. Furthermore, with the advance of low power digital electronics it is now possible to parametrically discipline a nearly-ideal inertial wave gyroscope to yield an ideal mechanical gyroscope with performance limited only by physical noise an not by slowly changing unbalance in the parameters of motion. The disc resonator gyroscope (DRG) is one example of a micromachined inertial wave gyroscope that is capable of this novel operation. See e.g., U.S. patent application Ser. No. 10/639,134 by Shcheglov et al., filed Aug. 12, 2003; Ser. No. 10/639,135, by Shcheglov et al., filed Aug. 12, 2003; and Ser. No. 11/103,899, by Challoner et al., filed Apr. 12, 2005.

Figure 1A:
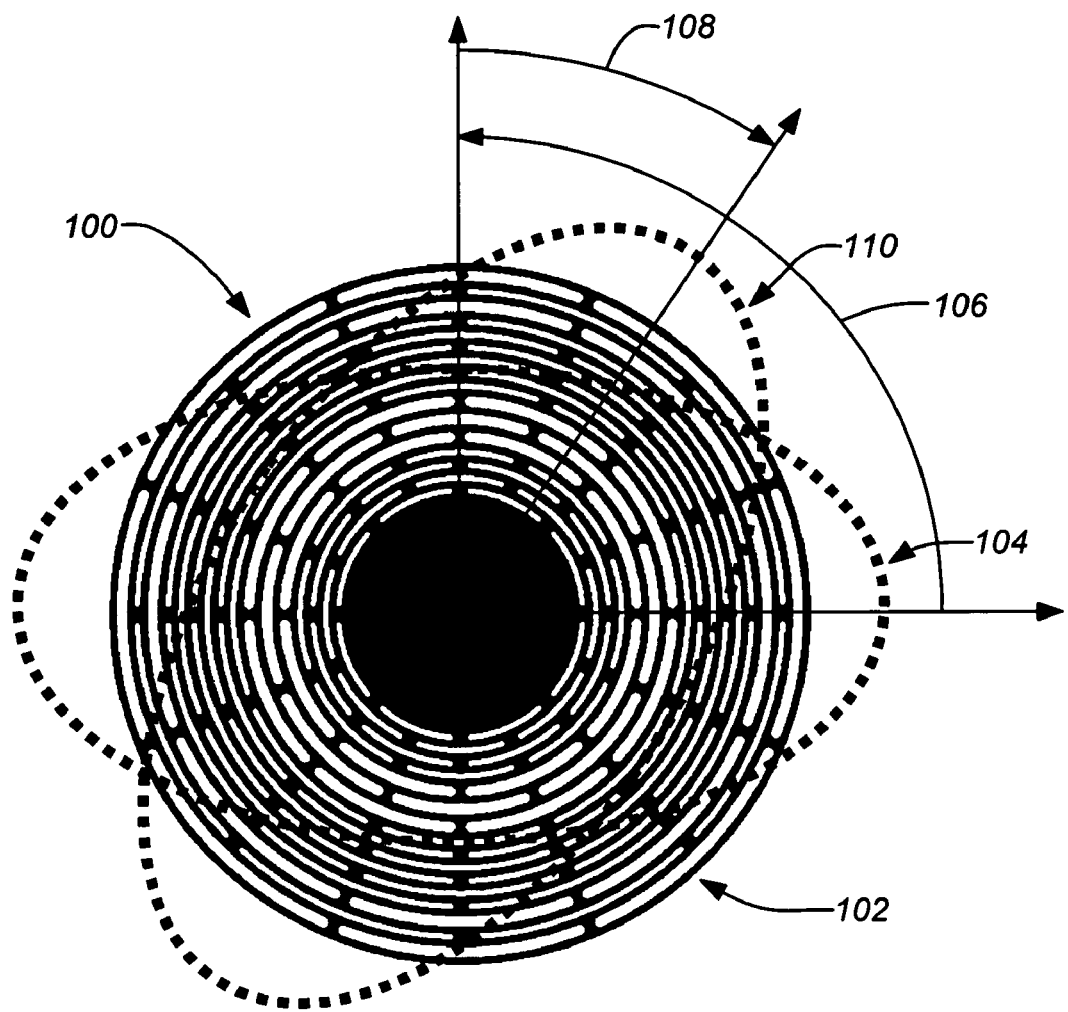
FIG. 1A illustrates operation of a disc resonator gyroscope.
Figure 1B:
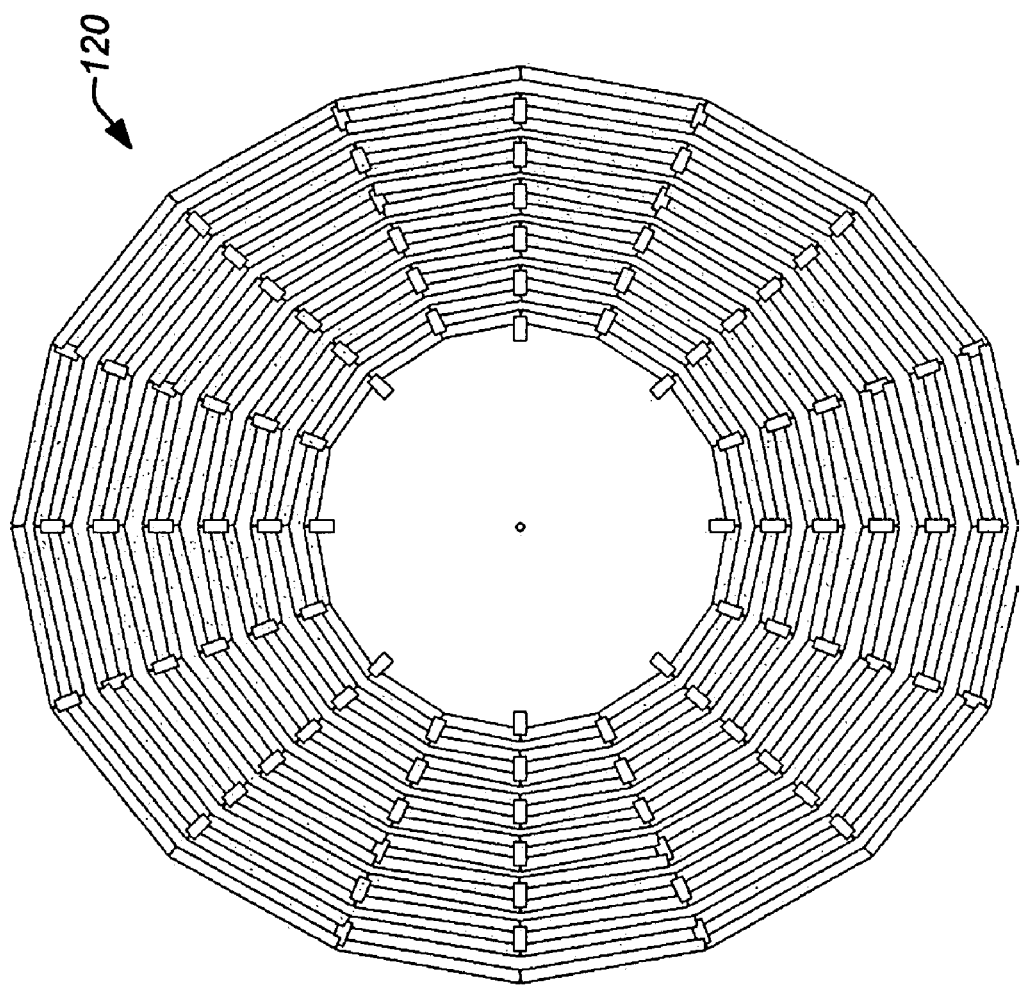
FIG. 1B illustrates a computed resonator degenerate vibration mode shape with inter-modal, Coriolis-coupled mechanical angular gain, k=0.4.

FIGS. 1A and 1B illustrates operation and modeling of an exemplary disc resonator gyroscope. The free precession of the inertial wave is always a fixed fraction of the case rotation angle and to facilitate readout a constant amplitude vibration is maintained independent of pattern angle using typically a parametric drive. The disc resonator 100 is excited with the plurality of internal electrostatic electrodes 102 disposed in circumferential slots interior to the resonator 100. Excitation of the electrodes 102 generates a standing wave vibration pattern illustrated by the indicated oval in a first position 104. As the disc resonator 100 is subjected to a 90 degree rotation 106, the standing wave vibration pattern undergoes a retrograde motion (precession) of approximately a 36 degree rotation 108, i.e. approximately 0.4 times the rotation. Thus, the standing wave vibration pattern moves to the second position 110 in response the 90 degree inertial rotation of the disc resonator 100. Movement and position of the standing wave is detected through sensing with the electrodes 102 as well to interpret the inertial rotation of the resonator. FIG. 1B illustrates a computed resonator degenerate vibration mode shape 120 of the disc resonator with inter-modal, Coriolis-coupled mechanical angular gain, k=0.4.

The micromachined disc resonator gyroscope (DRG) depicted in FIG. 1A is particularly well-suited for inertial wave operation because of its significant angular gain (k=0.4) and its electrode rich structure that provides high signal to noise ratio capacitance sensing as well as extensive intermediate electrode area for general electrostatic biasing. Its principal mode of vibration for inertial wave operation is shown in FIG. 1B.

Prior art inertial wave gyroscopes have certain design deficiencies and rely on classical closed loop state feedback control principles. See e.g., as have been described by Loper and Lynch (1983 IEEE DASC0, or Schkel and Howe (U.S. Pat. No. 6,418,285), A significant impediment to noise limited drift operation and shape-determined scale factor in the current practice is that the natural frequency of all vibratory gyroscopes vary with temperature, primarily because of the temperature dependence of material Young's modulus. In the current art this natural frequency is tracked by the readout electronics using various AGC or phase-lock loop devices. Having a variable frequency in the electronics of a navigation grade wave-based gyroscope leads to significant electronics processing errors and phase noise errors due to the slow variation of resonator frequency in relation to other electronics noise components other than physics-based random noise or adjacent gyroscope or radio interference leading to low frequency rate drift. Complete identification of parameters of the motion with variable resonator frequency is also problematic. Thus, the prior art does not include the novel parametrically disciplined inertial wave operating principle disclosed herein. Parametrically disciplined operation comprises setting or controlling to a substantially fixed value the parameters of the motion, e.g. frequency, phase, amplitude or damping, without dynamic state feedback or direct forcing of the motion itself. It is understood that the dynamic states can be the instantaneous motion states or their sinusoidal components at the resonator frequency. Prior art state feedback may be appropriate when there is large parameter uncertainty, but in a near-ideal gyroscope this is not the case. The complexity and stability considerations and errors due to the control forces may dominate the errors due to electronic sensor noise and thermal mechanical noise or limit dynamic range.

Figure 1C:
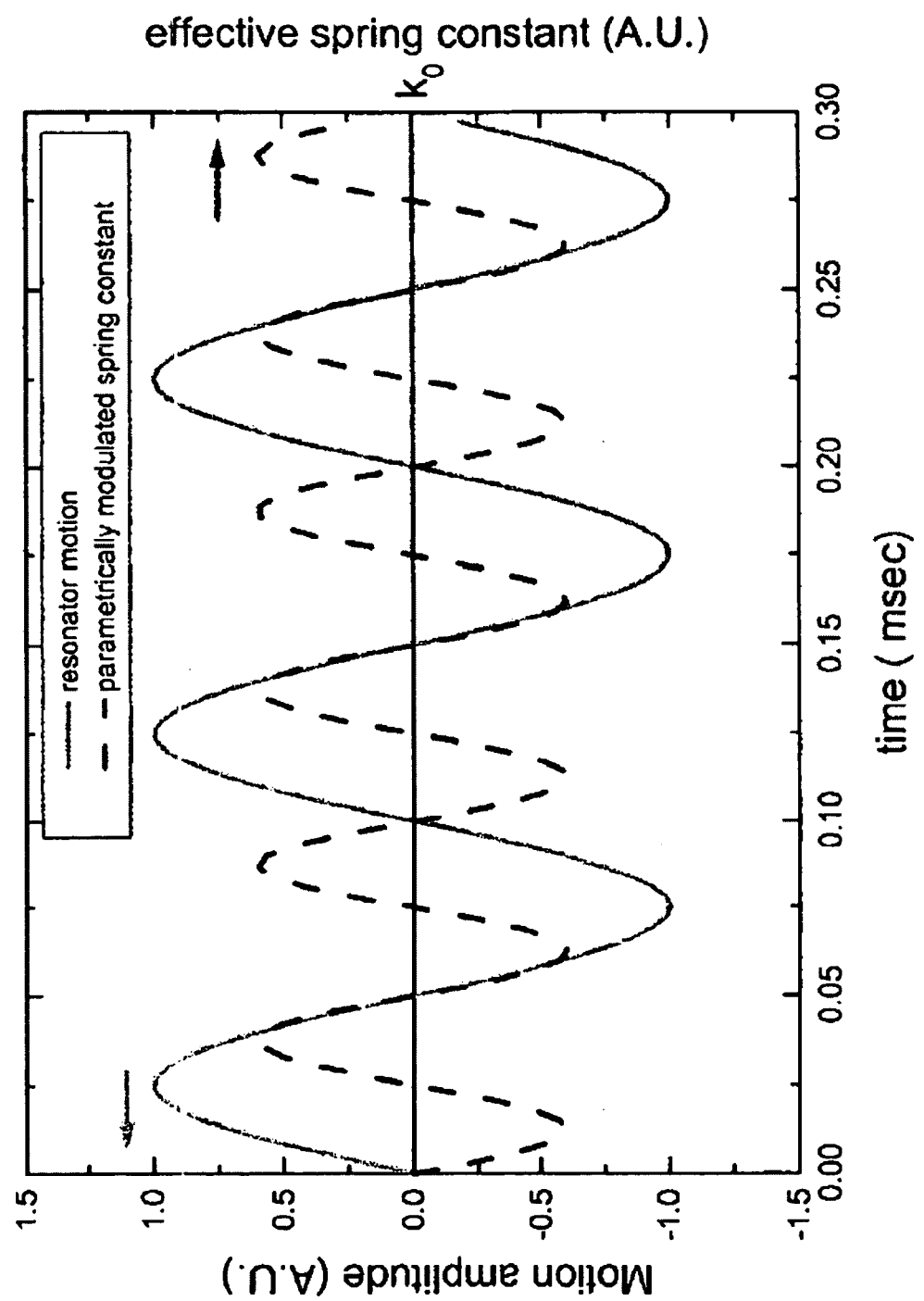
FIG. 1C is an example plot of parametrically driven 10 KHz resonator.

FIG. 1C is an example plot of parametrically driven 10 KHz resonator. The resonator motion, as well as the effective spring constant modulation due to parametric excitation, are shown. The parametrically modulated or controlled spring constant is twice the resonator frequency, f.

Drift arising from electromechanical and interface electronics imprecision, can be identified and electrostatically trimmed in principle, but this has not yet been done completely with physical noise-limited parameter precision, i.e., parametrically disciplined. Parameters such as frequency and damping are very slowly changing with temperature so allow much lower estimation filter bandwidth and hence lower errors relative to the very high frequency dynamic motion states. Accordingly, the present invention is directed to improved operation of an inertial wave resonator gyroscope such as the DRG, employing near-ideal fabrication methods for high quality resonators. Embodiments of the invention implement a complete parametrically disciplined operation and thereby achieved ideal, physical noise-limited micromachined digital electronics operational performance with a near-ideal inertial wave gyroscope.

A completely disciplined inertial wave gyroscope as taught herein, has no need for fast state feedback loops and would consume considerably less power, especially if distributed digital electronics (e.g. U.S. patent application Ser. No. 10/639,134) are employed, rather than a centralized code-based DSP as taught in the prior art. Furthermore, the ideal axisymmetric planar disc resonator gyroscope (e.g. U.S. patent application Ser. No. 10/639,134) is internally resonant, sensed, actuated and trimmed, so it is suitable for inertial wave operation and has a sufficiently complete and effective set of electrostatic bias electrodes to practice fully disciplined operation as described herein. In addition, the disc resonator gyroscope has high modal mass, and high capacitive sense signal to noise. Capacitance sense electronics for a DC biased micromachined gyroscope is the low-impedance trans-impedance amplifier (U.S. Pat. No. 6,079,272) versus the high impedance buffer alternatives that are subject to errors due to charge build up on the resonators. A general trans-impedance buffer interface can be based on (for Coriolis sensors (U.S. Pat. No. 6,467,346)).

Parametric excitation (i.e., excitation at double the mode frequency) provides a way to increase effective mode Q's and lock the frequencies to an external frequency reference. Since ultrastable atomic-transition stabilized frequency references are widely available in small volume and fairly low-power packages, such a method can provide a desired performance improvement to push the gyroscope into the navigation-grade performance space (e.g., <0.01 deg/hr). Modes of a vibratory gyroscope are excited at double the mode frequency using an ultra-stable frequency source. The strength of the excitation can be varied to dramatically increase and control mode Q's, and the mode frequencies will tend to lock to exactly half the excitation frequency. In this manner, an ultra-high Q, frequency-stabilized resonator can be achieved enabling an ultra-high performance gyroscope.

2.0 Analysis of a Parametrically Disciplined Harmonic Oscillator

Parametric driving of oscillators (where the resonator spring constant is modulated at twice the resonant frequency) is a known phenomenon from the optics and laser fields. The principle has recently been demonstrated in mechanical resonators as well. The gain provided by a parametric drive can be used to offset intrinsic resonator losses and increase and control the Q of the resonator. An additional benefit of the parametric drive is that the resonance frequency is defined by the frequency of the parametric excitation. Thus, an external frequency reference can be used to discipline the resonator, reducing scale factor variations and bias drift.

Analysis of a parametrically-disciplined simple harmonic oscillator may be described as follows. First, a basic equation describing the resonator, $$mx'' + gx' + (k_0 + k_1 \sin(2\omega t))x = F \sin(\omega t + \phi) \quad (1)$$

and the corresponding analytic solution, using a trial solution $x(t) = a \sin(\omega t + \theta)$, the following is obtained:

$$a = \frac{F}{\sqrt{k_0^2 + \frac{k_1^2}{4} + g^2\omega^2 - 2k_0 m\omega^2 + m^2\omega^4 + gk_1\omega\cos(2\theta) + k_1(k_0 - m\omega^2)\sin(2\theta)}} \text{ and} \quad (2)$$

$$\tan\theta = \frac{(k_1 + 2g\omega)\cos\phi - 2(k_0 - m\omega^2)\sin\phi}{-2(k_0 - m\omega^2)\cos\phi + (k_1 - 2g\omega)\sin\phi}. \quad (3)$$

It is apparent from Equation (2) that the damping term in denominator $g^2\omega^2$ can be cancelled by the term, $$\frac{k_1^2}{4} + gk_1\omega\cos(2\theta).$$

This occurs when $\theta = 90°$, and $k_1 = 2 g\omega$.

Figure 2A:
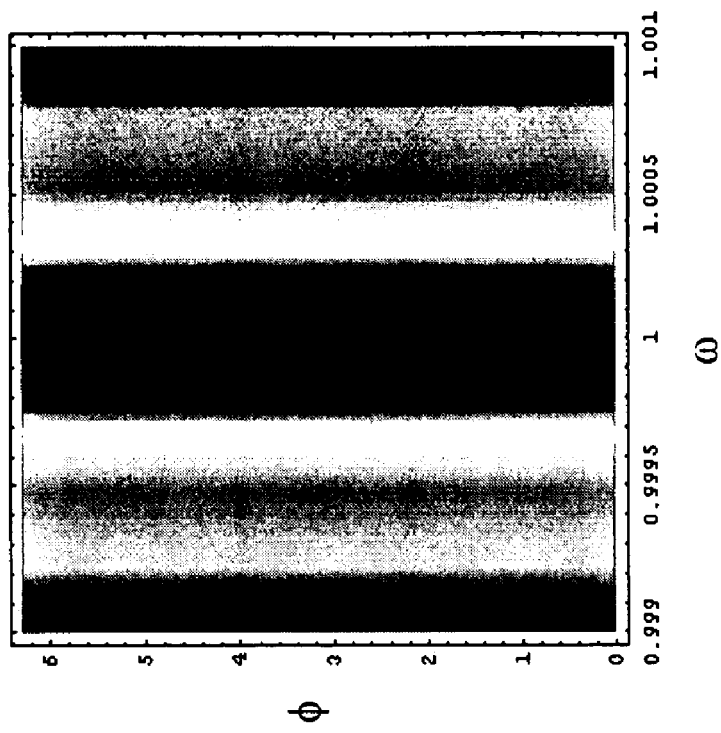
FIGS. 2A-2C illustrate the effect of the parametric excitation on the simple harmonic oscillator.
Figure 2A:
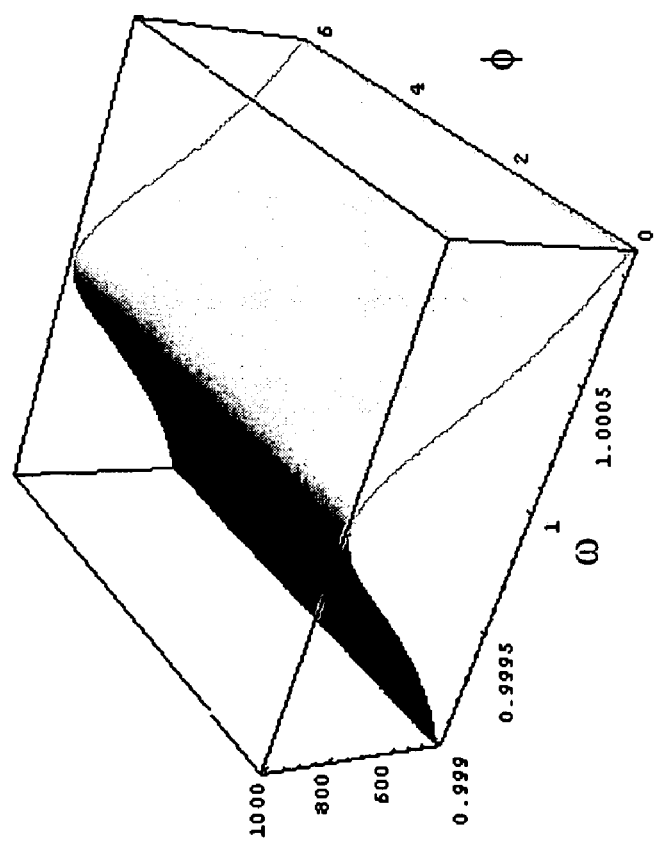
Figure 2B:
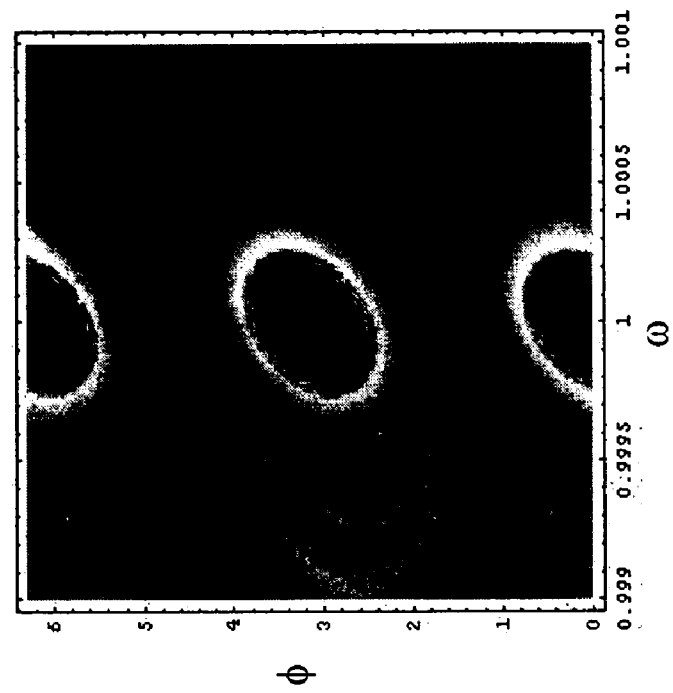
Figure 2B:
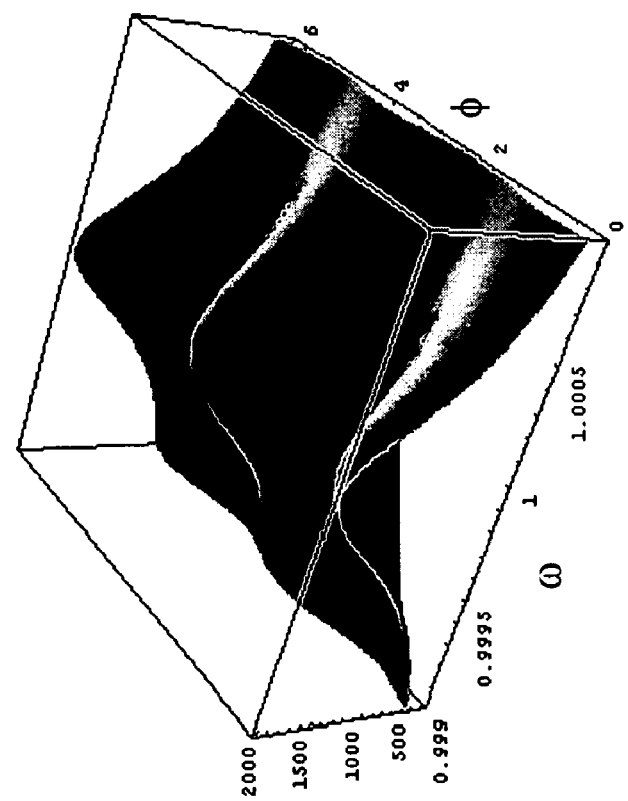
Figure 2C:
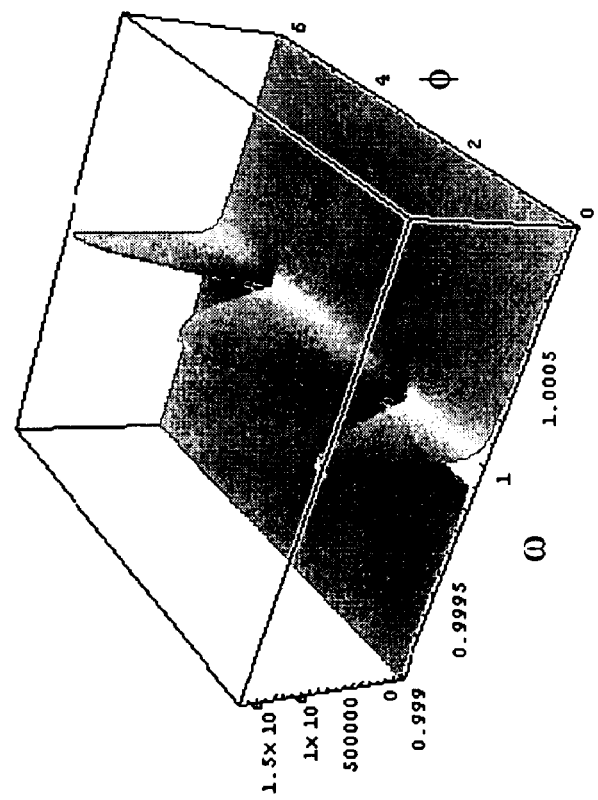
Figure 2C:
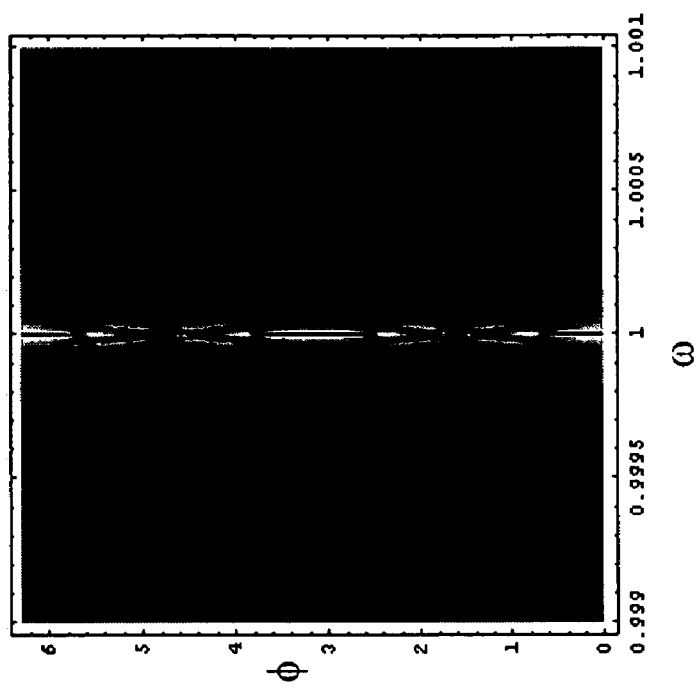

FIGS. 2A-2C illustrate the effect of the parametric excitation on the simple harmonic oscillator. The plots represent the steady-state oscillation amplitude for a unit input drive amplitude, F. The data is plotted versus frequency, $\omega$ (between 0.999 and 1.001), and the phase, $\phi$, of the parametric excitation relative to the drive (between 0 and $2\pi$ radians) and shown in a left three-dimensional plot and a right topographic plot. FIG. 2A describes a first case where $k_0 = 1.0$, $m = 1$, g=0.001, $k_1$=0.00, for a damped simple harmonic oscillator with no parametric excitation. FIG. 2B describes a second case where $k_0$=1.0, m=1, g=0.001, $k_1$=0.001, for a damped simple harmonic oscillator with sub-threshold parametric excitation. FIG. 2C describes a third case where $k_0$=1.0, m=1, g=0.001, $k_1$=0.001999 for a damped simple harmonic oscillator excited almost at threshold. Note the very high effective Q of the resonator. Embodiments of the present invention make use of this principle.

Figure 3A:
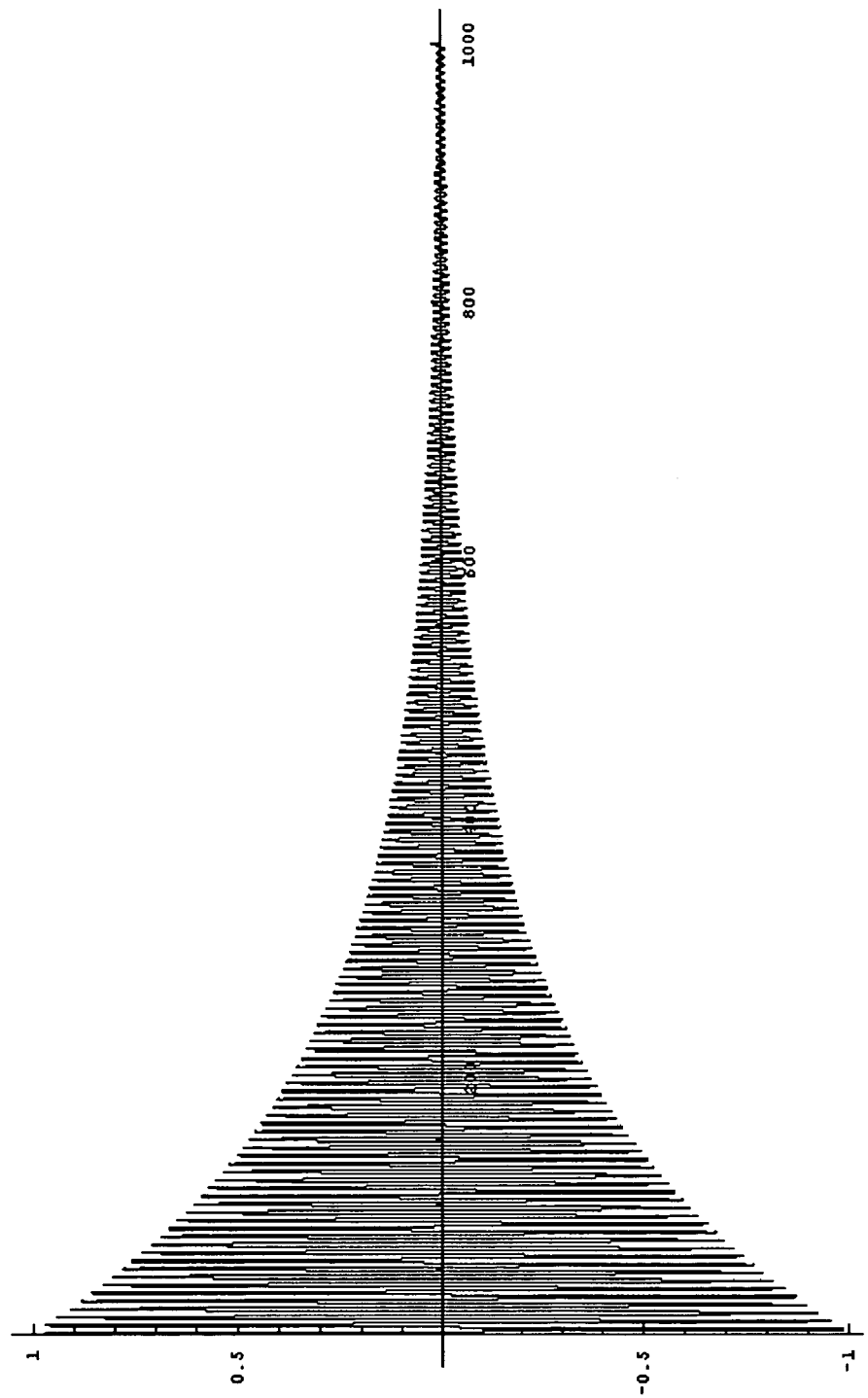
FIGS. 3A-3E illustrate some numerical simulation results for a parametrically-disciplined simple harmonic oscillator.
Figure 3B:
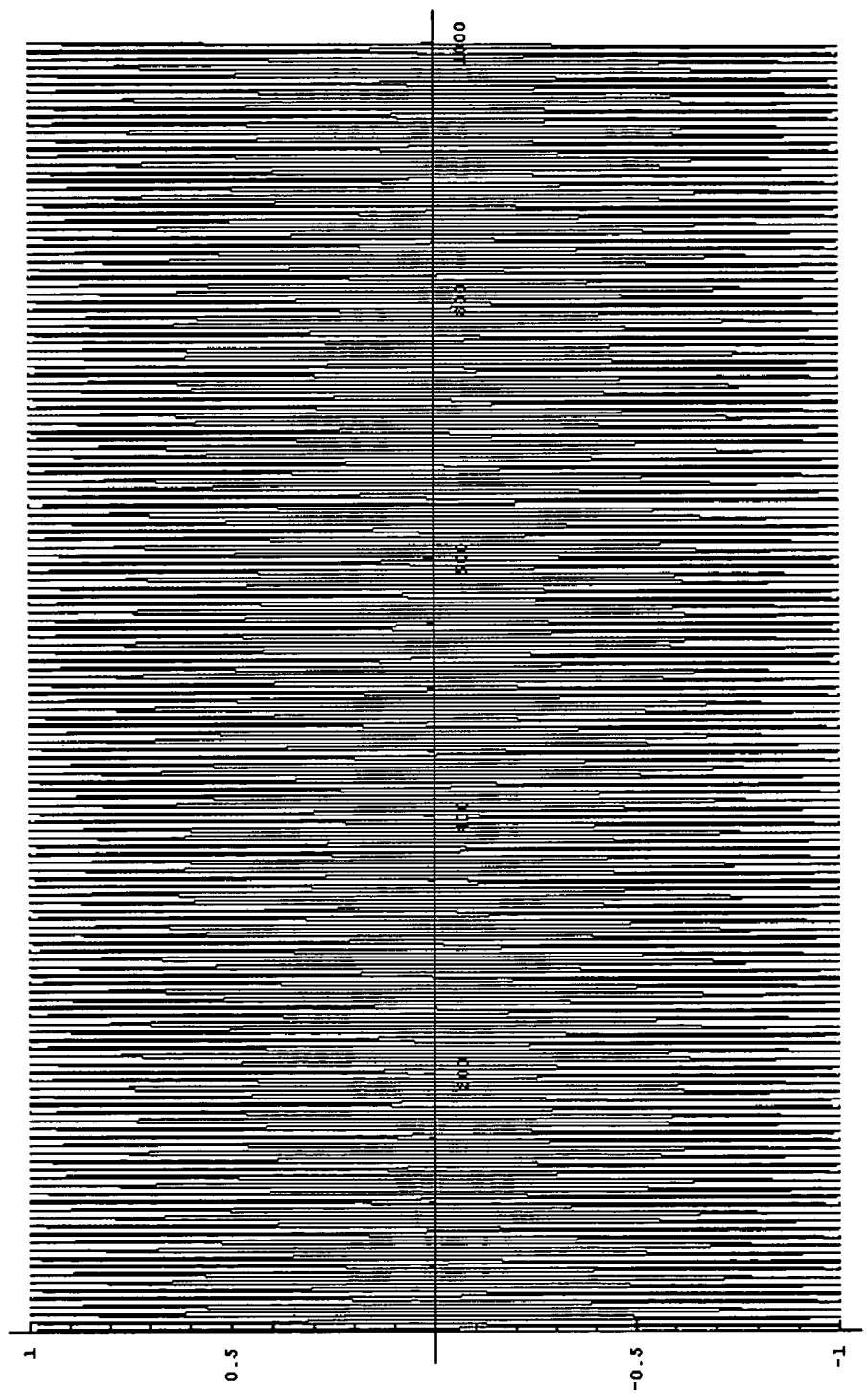

FIGS. 3A-3E illustrate some numerical simulation results for a parametrically-disciplined simple harmonic oscillator. Note that the apparent beating pattern in the waveforms is an artifact of converting a dense drawing to a bitmap of finite resolution. FIG. 3A illustrates the widely known dynamics of a simple harmonic oscillator with damping where m=1, $k_0$=1, g=0.01, $k_1$=0, F=0, x(0)=1, x'(0)=0. The oscillation exhibits the classical decaying exponential envelope. FIG. 3B illustrates the same oscillator with parametric excitation at twice the natural frequency where m=1, $k_0$=1, g=0.01, $k_1$=0.02, F=0, x(0)=1, x'(0)=0. This causes the oscillation to be self-sustaining. The parametric excitation amplitude is set at the self-oscillation threshold.

Figure 3C:
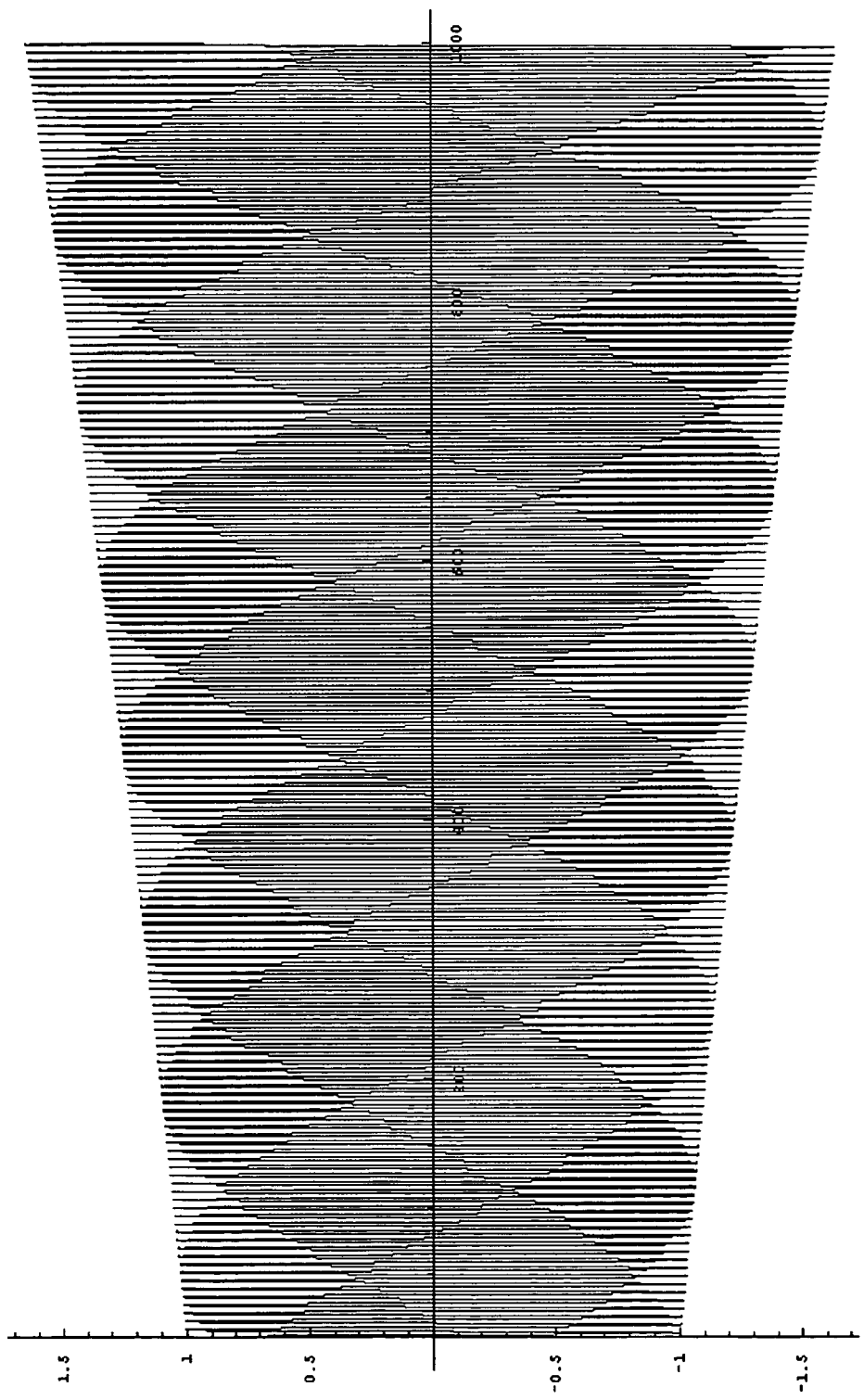
Figure 3D:
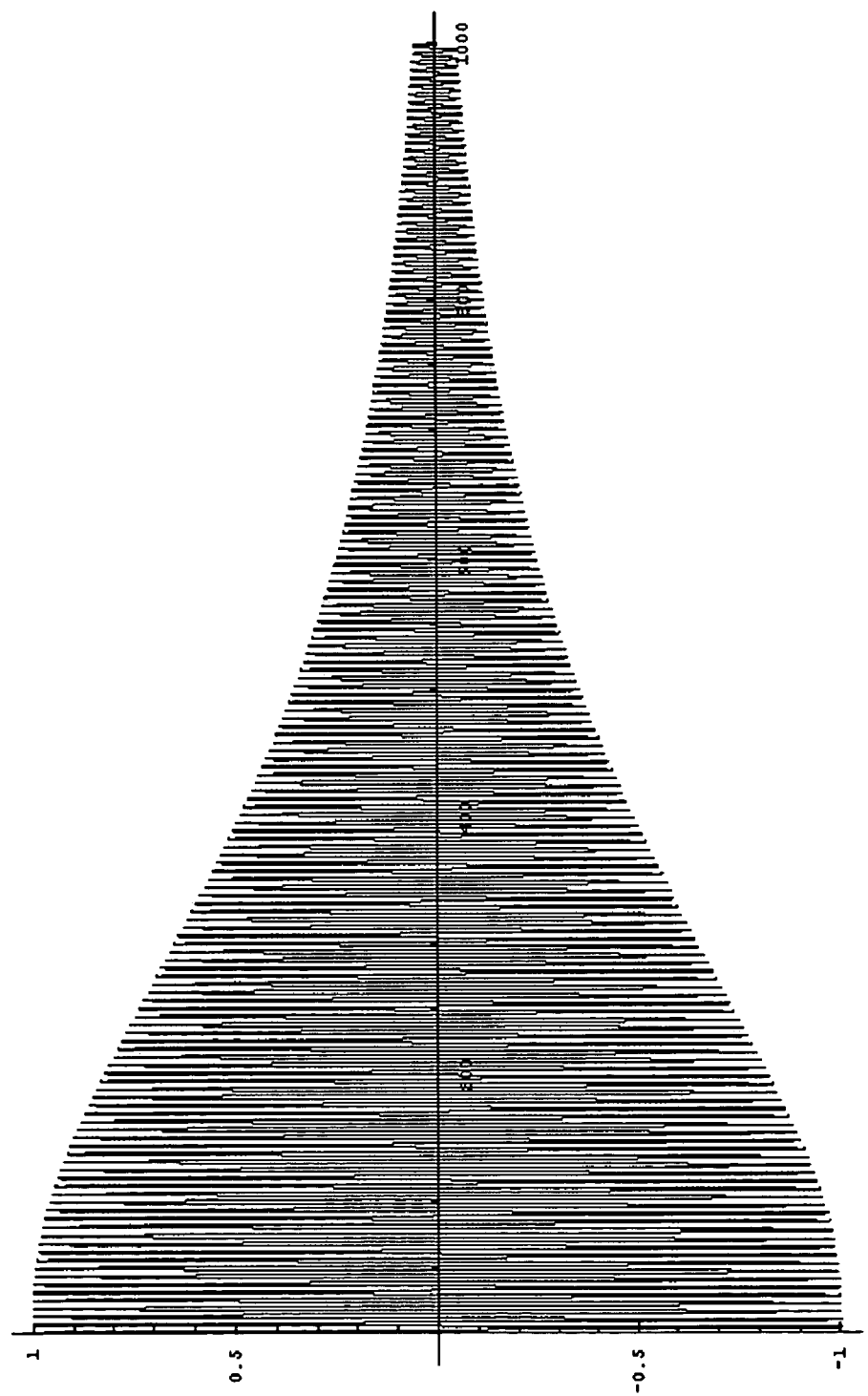
Figure 3E:
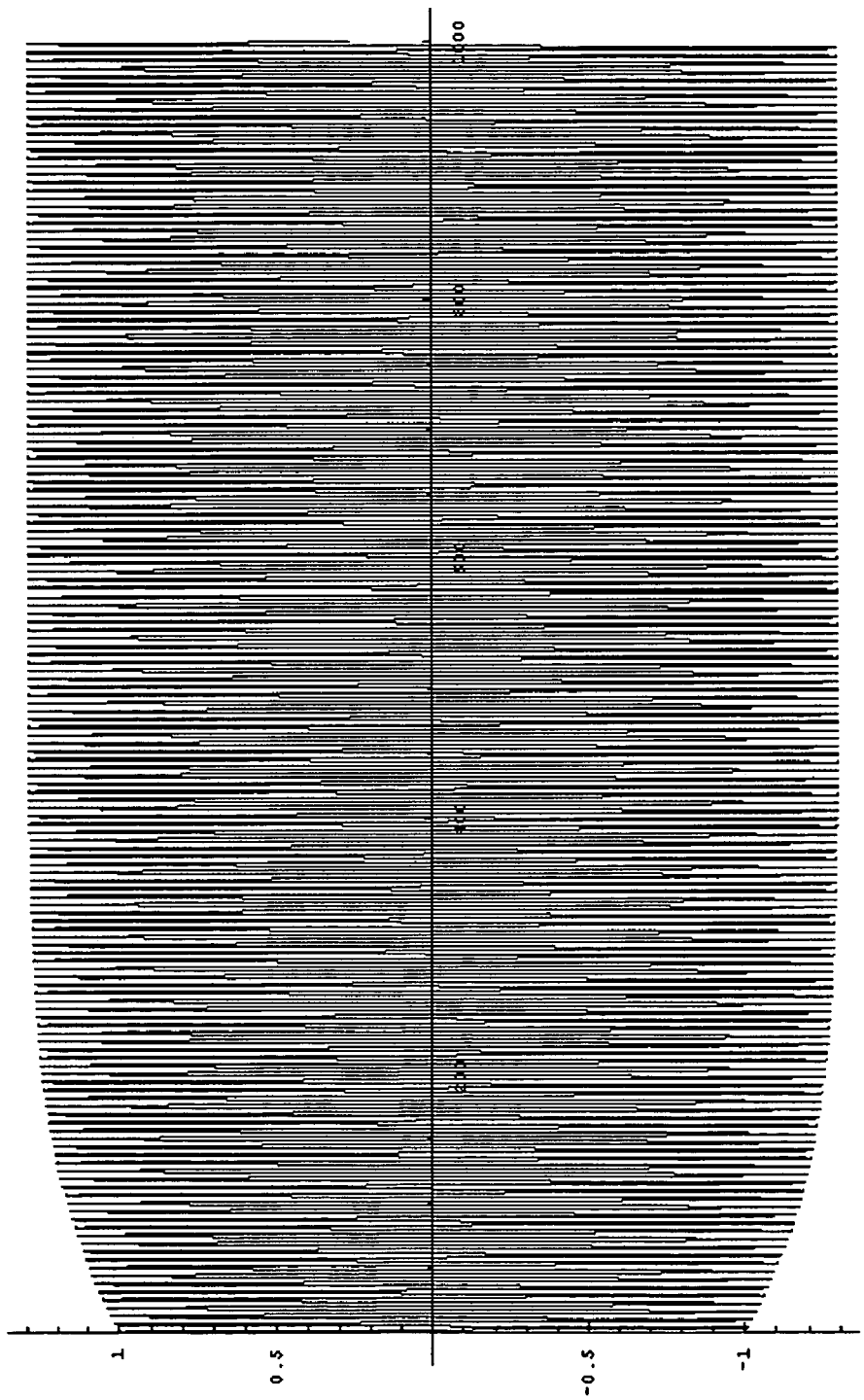

Increasing the parametric excitation amplitude causes the oscillator to have negative damping—the oscillation amplitude grows exponentially as shown in FIG. 3C where m=1, $k_0$=1, g=0.01, $k_1$=0.022, F=0, x(0)=1, x'(0)=0. FIG. 3D shows the dynamics of an oscillator with the same parameters as in FIG. 3B, except that the natural resonance frequency has been increased by 0.5% by increasing the stiffness of the spring from 1.00 to 1.01. For the oscillator of FIG. 3D, m=1, $k_0$=1.01, g=0.01, $k_1$=0.02, F=0, x(0)=1, x'(0)=0. It is apparent that the parametric pumping at the same amplitude no longer produces self-sustained oscillation. However, by increasing the parametric excitation amplitude (in this particular case from 0.02 to 0.0284), a self-sustaining oscillation condition can be recovered. FIG. 3E illustrates this case where m=1, $k_0$=1.01, g=0.01, $k_1$=0.0284, F=0, x(0)=1, x'(0)=0. It is important to note that the resonator now oscillates at half of the parametric pump frequency, and NOT at the natural frequency.

3.0 Parametrically Disciplined Gyroscope Operation

Nearly degenerate-mode vibratory gyroscopes require high Q's and close frequency matching to enable high performance (e.g., less than approximately 0.1 deg/hr). Since achieving stable high Q's and minimal frequency splits can be challenging for certain resonator scales, an electronic method is desirable for tuning Q's and frequencies of the two modes.

Applying the foregoing analysis, embodiments of the invention include a parametrically-disciplined inertial wave gyroscope having twice its natural oscillation frequency in the neighborhood of a sub-harmonic, 2 f of an external stable clock reference, 2 Nf. A direct digital synthesizer can also be used to provide a stable clock reference, 2 f at twice the mean resonator oscillation frequency. To obtain disciplined operation of the resonator at frequency f, an electrostatic bias electrode can be driven at the 2 f reference frequency. Disciplined frequency and phase operation of the resonator can be achieved, for example, through self-disciplined operation, requiring no digital discipline of frequency or phase.

Alternately, the gyroscope may be digitally disciplined by comparing the phase from a digital reference model of the resonator, electrodes and readout electronics driven by or referenced to the external clock with the measured phase of the actual resonator and adjusting a dc bias voltage on the actual resonator to reduce the phase error to zero. In addition, the amplitude parameter may be digitally disciplined to a fixed reference value by initially utilizing the model bias values, based on estimated stiffness sensitivities to bias voltages, for the actual biases. The reference model predicted sensor components are compared to the measured values to determine any error. The error may be filtered in a least mean square (LMS) filter and the applied to update the estimated model parameters including electrostatic bias sensitivities and required bias voltages. Thus, the actual DC (0 frequency) and 2 f bias voltages are updated to the new values.

In addition, embodiments of the invention may operate to discipline damping. For example, a nearly symmetric parametrically-disciplined inertial wave gyroscope, such as a disc resonator gyroscope, can be allowed to oscillate in any transverse direction. The gyro has more than one bias electrostatic electrode that can be independently driven at twice its oscillation frequency at amplitude and phase that disciplines its effective damping to zero in any vibration direction.

Furthermore, embodiments of the invention may operate to discipline precession rate. For example, a parametrically-disciplined inertial wave gyroscope can be operated such that the precession rate of the driven vibration pattern is digitally disciplined to a prescribed non-zero reference value, $\Omega_p$. For example, a digital model of the inertial wave gyroscope having an estimated inertial rate parameter, $\Omega$, and prescribed non-zero values for its forcer component parameters, corresponding to generation of the prescribed reference precession motion at $\Omega_p$, can be used to generate predicted sense sinusoidal components (e.g., S1$c$, S1$s$, S2$c$, S2$s$). The model prescribed forcer sinusoid components are applied to the actual gyroscope and the predicted sense components are compared with measured sense components to produce a prediction error (e.g., $\delta$S1$c$, $\delta$S1$s$, $\delta$S2$c$, $\delta$S2$s$). This prediction error can be filtered in a least mean square (LMS) filter to generate updates for all of the digital model's estimated parameters including inertial rate, $\Omega$. By selecting suitably high $\Omega_p$, the LMS is well conditioned to yield accurate estimates of unbalance parameters in any direction, including stiffness and damping non-uniformity and their principal axes. These unbalance parameters can be disciplined to zero or nulled by resolving them into bias electrode voltages (e.g., BT1, BT2, BX1, BX2) at 0 (i.e., a DC voltage) and 2 f frequency and applying them to the actual gyro. Frequency degeneracy and damping along any case orientation can also be nulled or disciplined to zero in a similar manner.

Figure 4A:
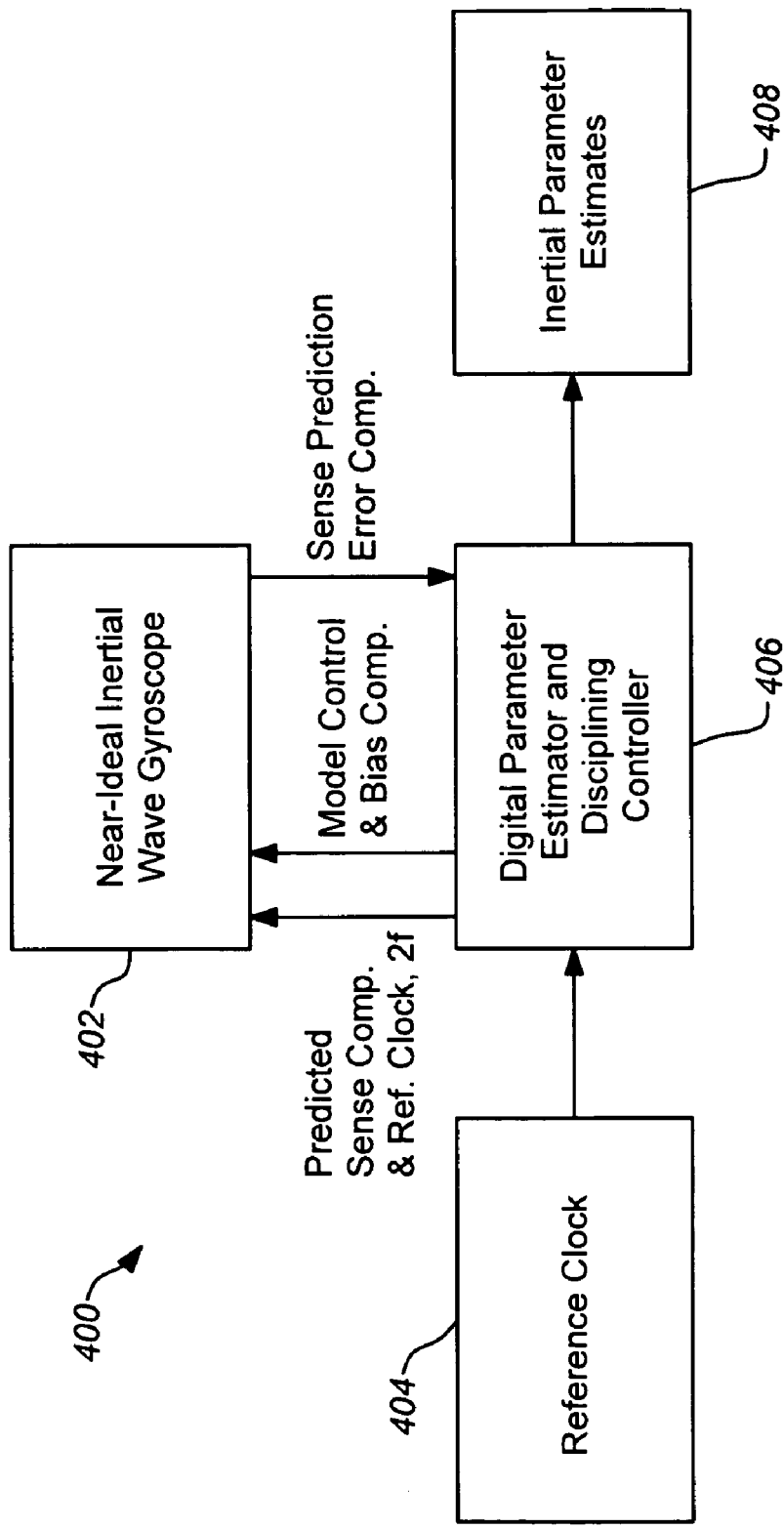
FIG. 4A is a functional block diagram of an exemplary gyroscope system employing parametrically disciplined operation.

FIG. 4A is a functional block diagram of an exemplary gyroscope system 400 employing parametrically disciplined operation. The near-ideal inertial wave gyroscope 402 is operated with the digital parameter estimator and disciplining controller 406. The gyroscope 402 (e.g. a disc resonator gyroscope) may employ symmetric damping, stiffness, electrostatic forcers, pickoff and buffer electronics gains. The gyroscope 402 should be capable of electrostatically adjustable stiffness in any direction at frequencies of 0 (static) and 2 f, where f is the resonance frequency. The controller 406 receives a stable frequency signal from the reference clock 404 of $f_{ref}$=2N×f. The controller 406 employs a computed propagation model (digital model) for the inertial wave gyroscope 402 sense components. The model may be parameterized by mass, Coriolis coupling gain, mechanical stiffness, damping, electronics pickoff and forcer gain matrices and electrostatic bias voltage sensitivity matrix, inertial phase, $\Phi$, inertial rate, $\Omega$, and inertial acceleration, $\alpha$, parameters. A least mean squares filter of the sensor prediction error components is employed by the controller 406 to update the estimated model parameters. The disciplining algorithm of the controller 406 is to compute updates to bias components at 0 and 2 f to discipline the resonator to oscillate at the reference frequency (f=$f_{ref}$/2 N) and phase and to null damping, balance stiffness and maintain rms sense amplitude at a reference value. In addition, a forced precession algorithm may be performed by the controller 406 to compute control components required to maintain a prescribed pattern precession rate, $\Omega^v{}_p$. The gyroscope 402 generates sense prediction error components with respect to the reference clock 404 signal and the controller produces inertial parameter estimates, e.g., $\Phi$, $\Omega$, $\alpha$.

Figure 4B:
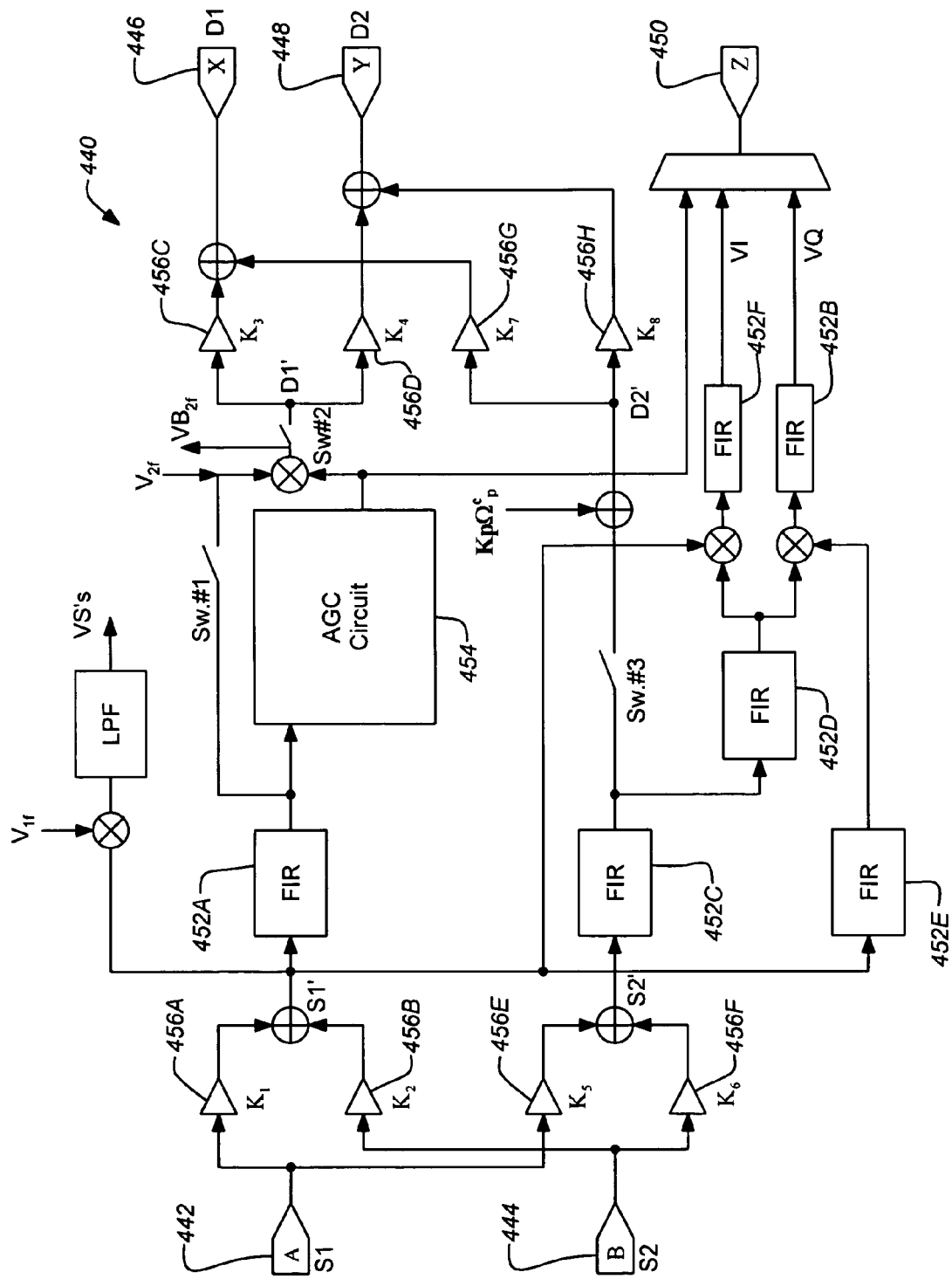
FIGS. 4B-4E illustrate an exemplary controller operating an inertial wave gyroscope.

FIG. 4B illustrates an exemplary controller 440 for an inertial wave gyroscope, such as a disc resonator gyroscope. The controller 440 may conveniently operate in at least three different modes which may be set through switch combinations according to the matrix below. Note that switch #4 is set in the integrator circuit of FIG. 4E.

| Mode | Switch #1 | Switch #2 | Switch #3 | Switch #4 |
|---|---|---|---|---|
| 1 | closed | closed | closed | open |
| 2 | open | open | closed | open |
| 3 | open | open | open | closed |

Operation of the controller 440 requires that the initial DC balancing parameters in the electrostatic bias generator have been found and that the gyroscope has been made ideally degenerate. The input signals to the controller 440 are denoted by the A (Axis 1 sensor signal, S1) and B (Axis 2 sensor signal, S2) channels 442, 444, respectively. The controller 440 outputs are the X (Axis 1 forcer signal), Y (Axis 2 forcer signal), and Z channels 446, 448, 450, respectively. The exemplary controller 440 can employ six fully programmable finite impulse response filters (FIRs) 452A-452F. (A seventh fully programmable finite impulse response filter may reside within the AGC circuit 454. The programmable gains, $K_1$ through $K_8$ of amplifiers 456A-456H, respectively are operated with sinusoidal gains, e.g. $K_1=K_3=\cos\Phi$, $-K_4=K_2=\sin\Phi$, $-K_7=K_5=-\sin\Phi$, and $K_6=K_8=\sin\Phi$, where $\Phi=\Phi_{pm}$, the instantaneous location of the vibratory node or pattern precession in terms of electrical modal phase. These two coordinate changes provide the needed transformations of the case fixed sense signals (S1,S2) to the instantaneous standing wave pattern frame and wave referenced forces for precession back into the case fixed forcer frame (D1,D2) The following relationships are applied to the electrostatic bias controller:

$$VBT1 = kT10*Vref + kT12*VB_{2f}$$

$$VBT2 = kT20*Vref + kT22*VB_{2f}$$

$$VBX1 = kX10*Vref + kX12*VB_{2f}$$

$$VBX2 = kX20*Vref + kX22*VB_{2f}$$

$$VGB = kGB*Vref$$

kxxx can be determined by measuring VQ and VI versus $\Phi$. Kji0 are selected to null VQ when $\Phi$ is aligned with the ith axis (i=1,2) of jth frame (j=T,X) based on an electrostatic stiffness model. Kji2 are selected to null VI when $\Phi$ is aligned with ith axis (i=1,2) of jth frame (j=T,X) when there is no precession rate or from an on-line LMS identification filter when there is non-zero inertial rate adding to VI.

Mode 1 operates the gyroscope conventionally under a force to rebalance with free-running resonator frequency. This represents the original closed loop AGC drive and closed loop force to rebalance output detailed in U.S. Pat. No. 6,915,215 with additional elements defined FIG. 4B-E. In this case, the new prescribed precession rate, $\Omega^c{}_p$ and $\Phi_o$ parameters are set to zero so $\Phi=\Phi_o$ and $\Omega=VI/Kp$. (Note that k is mechanical angular gain and 2k is electrical angular gain; Kp=Ks/(2k) is the force to rebalance scale factor.) In this design, as a result of the parameterization of the transformation gains with $\Phi$ the vibration drive pattern can be set to any angle in the case by setting $\Phi$ and the force to rebalance output VI or scale rate bias $\Phi$ and quadrature output VQ can be plotted versus $\Phi$. For an ideal degenerate gyroscope with finite but symmetric damping, VI=VQ=0.

Figure 4C:
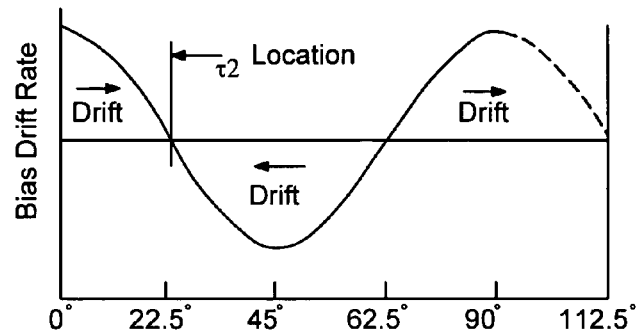

Alternately, for a non-degenerate, unbalanced gyroscope a plot of VI or AGC control voltage into the multiplier can be plotted versus $\Phi$ to identify axes of minimum and maximum damping. Case-oriented drift due to damping unbalance is the primary source of bias and drift in the known HRG. Drift is zero along the damping principal axes ($\tau 1,\tau 2$) and maximum in between as illustrated in the graph of FIG. 4C. Case-oriented drift is always in the direction toward the axis of maximum damping, $\tau 2$, in this case.

Figure 4D:
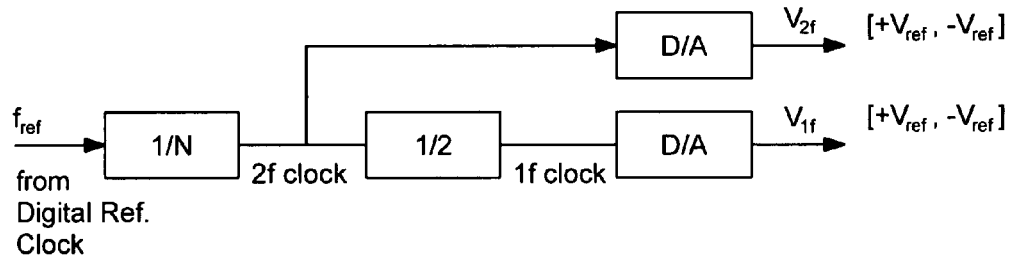

FIG. 4D illustrates and exemplary reference signal generator. The original clock signal $f_{ref}$ is divided by N to yield a 2 f signal which is directly converted to analog to provide $V_{2f}$ and also divided by 2 (to yield f) and converted to analog to separately provide $V_{-1f}$, $V_{-2f}$ and $V_{-1f}$ are applied to the controller 440 of FIG. 4B as indicated.

Mode 2 operates the gyroscope under force to rebalance as in Mode 1 but now with a disciplined resonator frequency. Opening switches #1 and #2 and applying $V_{-2f}$ reference level (+/-Vref) square wave from the reference generator shown in FIG. 4C to the AGC modulator input produces a scaled modulator output $VB_{2f}$ that transforms the original closed loop AGC drive into a self-disciplined open-loop drive. This drive, as shown in the analysis of a single harmonic oscillator, modulates the effective modal stiffness at 2 f and results in phase-lock of the resonator at the fundamental frequency, f, i.e., in phase with the $V_{1f}$ waveform. Demodulation of the S1 (quadrature sinusoidal component, S1's) with $V_{-1f}$ will result in S1's=0 if the natural resonator frequency, $f_r$, is in the neighborhood of f and lock-in occurs. The maximum allowable value for |f−fr| for lock-in to occur can be determined from the above harmonic oscillator analysis with a model for the electrostatic stiffness (parameter k1) based on resonator voltages and capacitance gaps or it can be determined empirically by adjusting the reference frequency (N value) until S1's=0 and lockin occurs. Preferably |f−fr| should be less than ½Q If $f_r$ begins to wander outside this range, then dc electrostatic bias parameters and resonator bias, kGB can be adjusted to shift $f_r$ back into the required neighborhood of f for lock in.

The weighting of the 2 f electrostatic bias voltages internal to the bias generator are adjusted at initial fabrication by now using the above $\Phi$ scan to locate the orientation of the minimum (t1) and maximum(t2) damping axes and to project them onto components for correction in the T and X frames. 2 f-biases, which give rise to negative damping, are increased along the directions with highest natural damping. A re-scan of F can identify the locations of any residual damping unbalance and further adjustments of the 2 f-biases can be made until damping asymmetry is nulled.

Mode 2 and Mode 1 have substantially the same force-to-rebalance output, but Mode 2 has no damping asymmetry and hence $\Omega=0$ for zero inertial rate input at any $\Phi$ location. On the other hand, Mode 1 has a fixed rate bias proportional to natural damping asymmetry that varies with $\Phi$ location.

Mode 3 operates the gyroscope under a forced precession with disciplined frequency. This mode, with switch #4 closed, is now responsive to the commanded precession rate, $\Omega^c_p$ and any inertial rate input, $\Omega$ that causes precession of the wave pattern. Because of the novel feedback selected the input and output coordinate transforms, Ki, are driven by $\Phi$, which keeps S2' nulled and hence locked with the pattern nodal axis as the pattern is either precessed by inertial rate or by a forced precession rate command that is integrated to produce a $\Phi$ that drives the coordinate transform and hence keeps S2' nulled and locked with the pattern nodal axis.

Figure 4E:
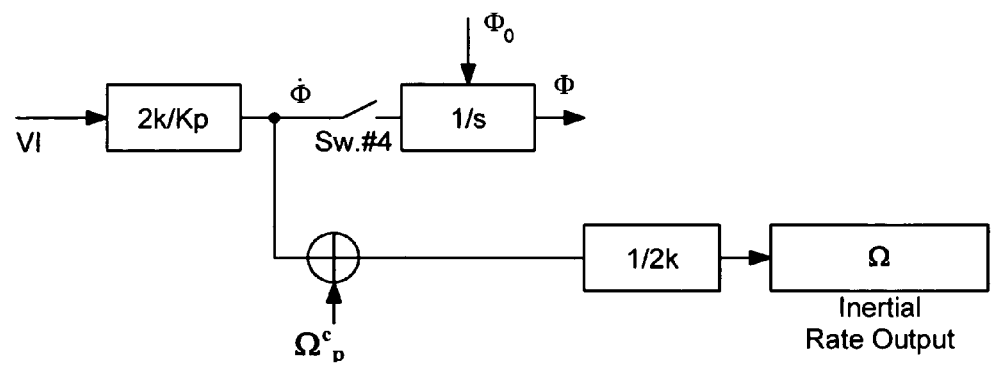

If $\Omega^c_p=0$, there will be no commanded precession and the output $\Omega$ is equal to inertial rate and $\Phi$ is the true inertial precession angle relative to the case. If $\Omega^c_p$ is non-zero this integrates directly to a continuous change in $\Phi$ or apparent precession in the absence inertial rate $\Omega=0$. If $\Omega^c_p=\Omega^c_0+\Omega$, then the forced precession rate will be $\Omega^c_0$ and the inertial rate output is $\Omega$ as shown in FIG. 4E.

One benefit under Mode 3 operation is the ability to set $\Omega^c_p/(2k)>\Omega$ max so that F is always changing. This enables continual averaging of residual biases, sometimes referred to as "carouseling," or continual identification and correction of residual damping along any case direction and hence the achievement of noise-limited drift.

Figure 4F:
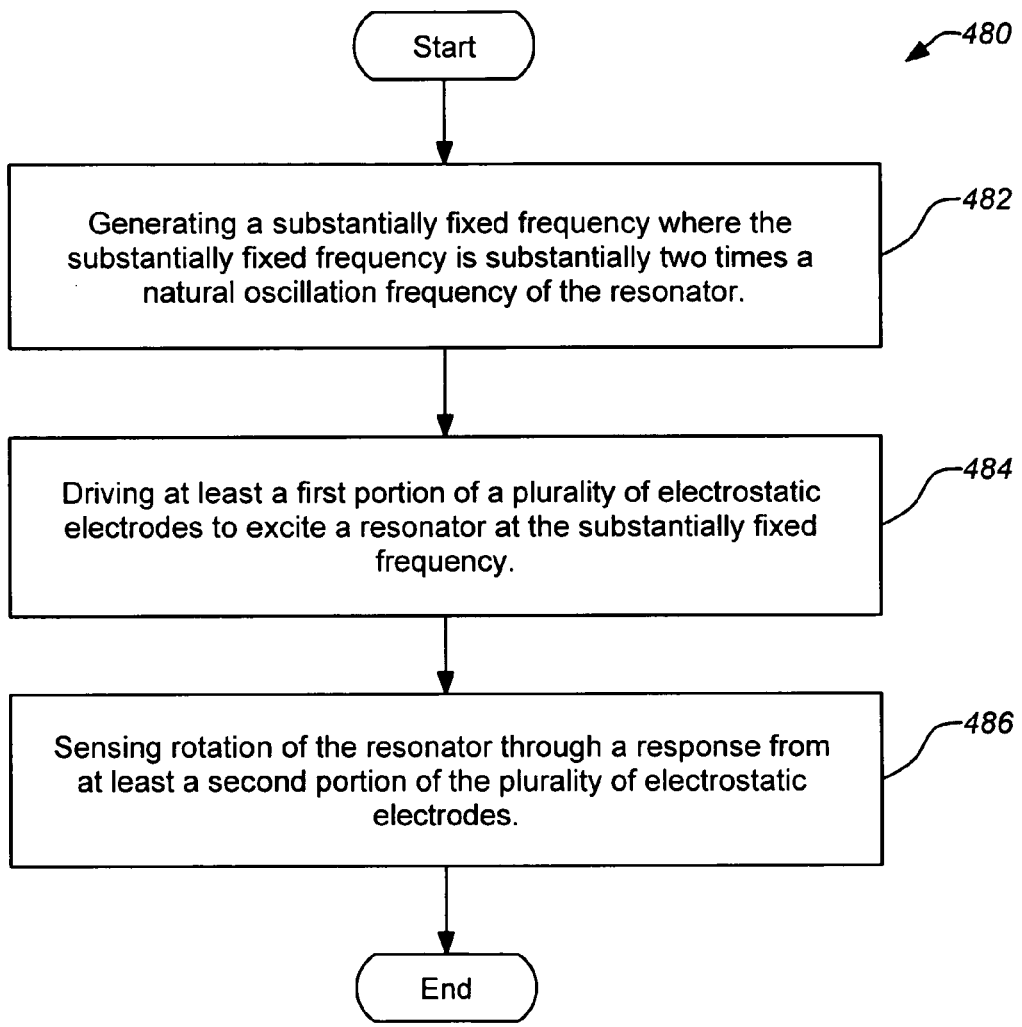
FIG. 4F is a flowchart of an exemplary method of the invention.

FIG. 4F is a flowchart of an exemplary method 480 of the invention. The method 480 begins with an operation 482 of generating a substantially fixed frequency. The substantially fixed frequency is substantially two times a natural oscillation frequency of the resonator. In operation 484, at least a first portion of a plurality of electrostatic electrodes is driven to excite a resonator at the substantially fixed frequency. In operation 486, rotation of the resonator is sensed through a response from at least a second portion of the plurality of electrostatic electrodes. The method 480 may be further modified consistent with the controller and as previously described.

Figure 5A:
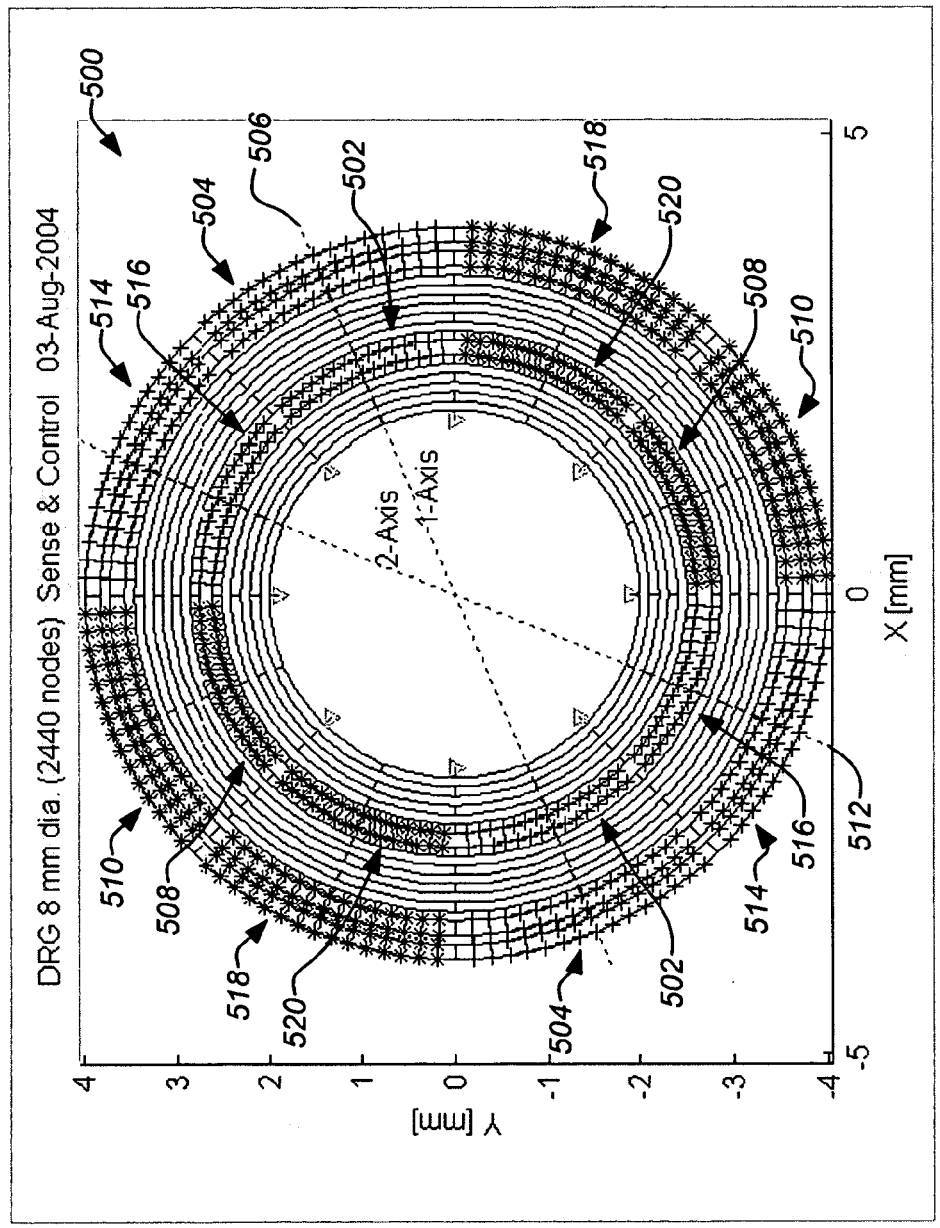
FIG. 5A shows a finite element analysis model of a disc resonator comprising 2440 nodes of internal rings with segments marked according to adjacent sense or control electrode name.

FIG. 5A shows a finite element analysis model 500 of a disc resonator comprising 2440 nodes of internal rings with segments marked according to adjacent sense or control (drive) electrode names. The S1+ and D1+ electrodes are indicated by the "+" symbols within 45 degree arc segments (e.g., inner D1+ circumferential electrodes 502 and outer circumferential electrodes 504) centered on the first axis 506 and on opposing sides of the resonator. Similarly, the S1– and D1– electrodes are indicated by the "*" symbols within 45 degree arc segments (e.g., inner D1– circumferential electrodes 508 and outer circumferential electrodes 510) centered on another axis (not shown) orthogonal to the first axis 506 and on opposing sides of the resonator. The S2+, D2+, S2– and D2– electrodes are disposed in the same pattern about a second axis 512 shifted 45 degrees from the first axis 506. The outer S2+ electrodes 514 and inner D2+ electrodes 516 are shown (indicated by the "+" symbols) within 45 degree arc segments centered on the second axis 512 and the outer S2– electrodes 518 and inner D2– electrodes 520 (indicated by the "*" symbols) are disposed within 45 degree arc segments centered on another axis (not shown) orthogonal to the second axis 512 and on opposing sides.

Figure 5B:
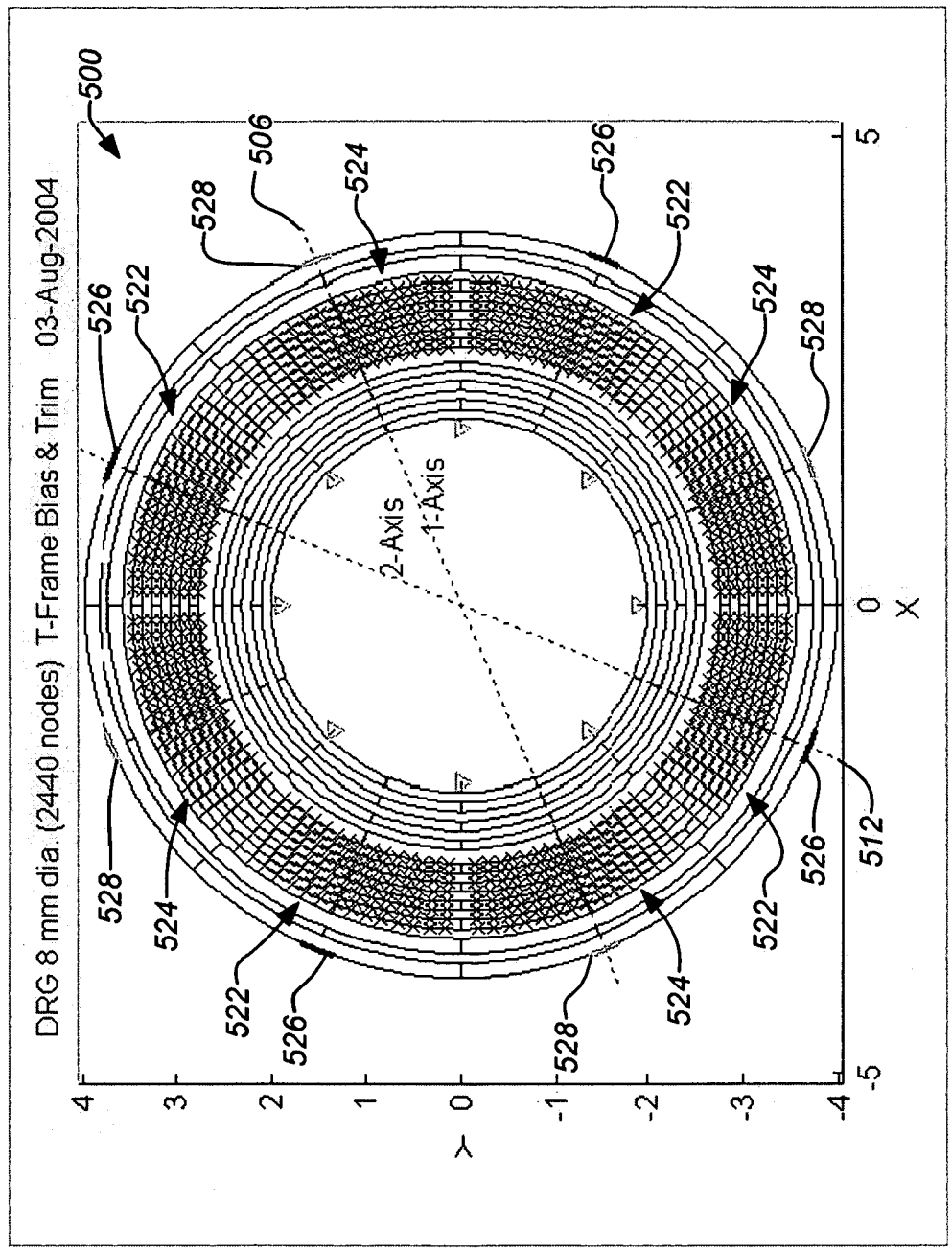
FIG. 5B shows the finite element analysis model with T-frame bias and trim adjacent electrostatic bias electrode locations and mechanical trim locations.

FIG. 5B shows the finite element analysis model 500 with t-frame bias and trim adjacent electrostatic bias electrode locations and mechanical trim locations. The BT1 bias electrodes 522 (indicated by the "x" symbols) are disposed in 45 degree arc segments centered on and orthogonal to the second axis 512. Similarly, the BT2 bias electrodes 524 (indicated by the "x" symbols) are disposed in 45 degree arc segments centered on and orthogonal to the first axis 506. In addition, mechanical trim locations MT1 526 and MT2 528 are disposed on the outer periphery of the resonator centered on and orthogonal to the first and second axes 506, 512, respectively. The mechanical trim locations are for material removal by laser or FIB trim techniques.

FIG. 5C shows the finite element analysis model 500 with x-frame bias and trim adjacent electrostatic bias electrodes and mechanical trim locations. Here, the pattern is analogous to that of FIG. 5B, but shifted 45 degrees. Mechanical trim locations MX1 530 and MX2 532 are disposed on the outer periphery as shown. The BX1 electrodes 534 (indicated by the "x" symbols) are disposed in 45 degree arc segments centered on orthogonal axes through the MX1 530 mechanical trim locations. Similarly, the BX2 electrodes 536 (indicated by the "x" symbols) are disposed in 45 degree arc segments centered on orthogonal axes through the MX2 532 mechanical trim locations.

The desired constant amplitude vibration of a resonator, e.g. the disc resonator 120 illustrated in FIG. 2, can be maintained with a parametric drive (2 f) at twice the resonance frequency, f. This can be accomplished by modulating the effective stiffness of the resonator electrostatically to increase the stiffness during periods of maximum elastic energy, thereby adding energy to the resonator vibration. These maxima occur twice per normal resonance period, 1/f, so a 2 f parametric drive, $V_{2f}$, can be used and applied to all bias electrodes $BT_1, BT_2, BX_1, BX_2$ substantially simultaneously. This may combined with the normal electrostatic trim biases.

Figure 6:
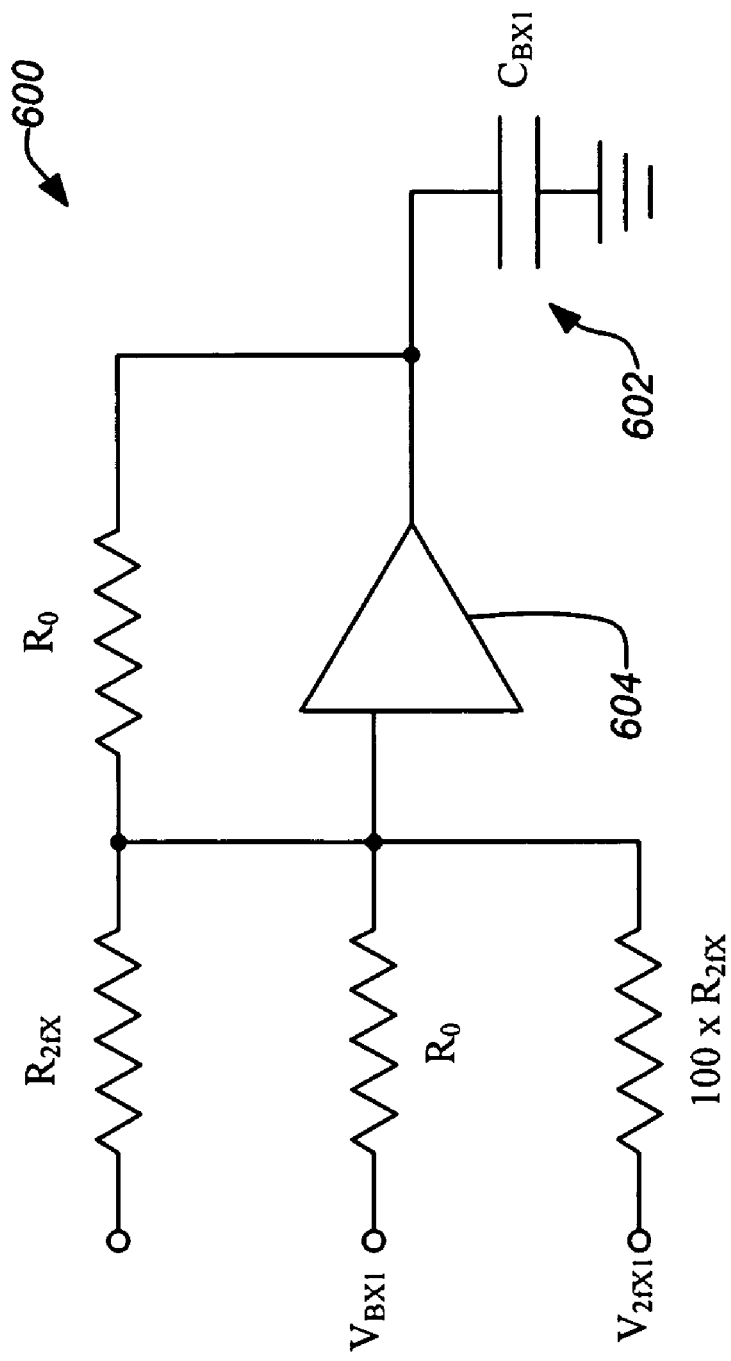
FIG. 6 illustrates an alternate circuit for a typical parametric drive for a single bias electrode.

FIG. 6 illustrates an alternate circuit 600 for a parametric drive for a single bias electrode for the example of voltage $V_{BX10}$, applied through a resistor $R_0$. The bias electrode $C_{BX1}$ 602 is driven with the amplifier 604 as shown. Applying voltage $V_{2fx1}$ to resistor $R_{2fX}$ compensates for the difference in area of the X versus T frame biases and provides sufficient parametric drive to maintain the desired amplitude against the mean damping losses. To trim the typical 1% damping unbalance due to gap non-uniformity or damping non-uniformity, a trim capability is added via a trim parametric drive component, $V_{2fX1}$, through the 100×$R_{2fX}$ resistor, selected to increase the energy per cycle and hence reduce the X1 component of damping or Q.

Finally, if the resonator is driven from a reference clock ($f_{ref}$), e.g., an atomic clock, and the natural frequency of the resonator, f is in the neighborhood of $f_{ref}$ then the effective stiffness of the resonator will be reduced. If f is above $f_{ref}$, the effective stiffness will be reduced bringing the natural resonance into lock with the atomic clock. The lock in range can be determined empirically or systematically and a frequency synthesizer selected along with an overall resonator bias or common bias electrode to ensure an appropriate mean frequency, f sufficiently close to $f_{ref}$ and lock in over the temperature range.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method of operating a gyroscope, comprising:
generating a substantially fixed frequency;
driving at least a first portion of a plurality of electrostatic electrodes to excite a resonator at the substantially fixed frequency; and
sensing rotation of the resonator through a response from at least a second portion of the plurality of electrostatic electrodes;
wherein the substantially fixed frequency is substantially two times a natural oscillation frequency of the resonator and the resonator comprises an inertial wave resonator and the first portion of the plurality of electrostatic electrodes excite a standing wave vibration pattern in the inertial wave resonator and the response sensed from the second portion of the plurality of electrostatic electrodes is from movement of the standing wave vibration pattern.

2. The method of claim 1, wherein operation of the gyroscope is self-disciplined requiring no digital discipline of the substantially fixed frequency.

3. The method of claim 1, wherein operation of the gyroscope is digitally disciplined by:
comparing phase from a digital reference model referenced to the substantially fixed frequency signal; and
adjusting a bias voltage on the resonator to substantially eliminate any phase error.

4. The method of claim 1, wherein the resonator can oscillate in any transverse direction and driving at least the first portion of the plurality of electrostatic electrodes to excite the resonator at the substantially fixed frequency comprises adjusting amplitude and phase to eliminate any damping of the resonator.

5. The method of claim 1, wherein the inertial wave resonator comprises a disc resonator.

6. The method of claim 1, wherein the response comprises a precession rate of the standing wave vibration pattern.

7. The method of claim 6, wherein the precession rate of the standing wave vibration pattern is digitally disciplined to a prescribed non-zero reference value.

8. The method of claim 7, wherein digitally disciplining the precession rate of the standing wave vibration pattern to the prescribed non-zero reference value comprises:
generating predicted sense sinusoidal components from with a digital model comprising an estimated inertial rate parameter and non-zero forcer sinusoidal component parameters to produce the prescribed non-zero reference value as the precession rate of the standing wave vibration pattern;
applying the non-zero forcer sinusoidal component parameters from the digital model to at least a third portion of the plurality of electrodes;
measuring sense component signals from at least a fourth portion of the plurality of electrodes;
comparing the predicted sense sinusoidal components with the measured sense component signals to produce a prediction error; and
updating the digital model with the prediction error to yield updates for all of the models estimated parameters including an updated inertial rate parameter.

9. The method of claim 8, further comprising filtering the prediction error with a least mean squares (LMS) filter before updating the digital model.

10. A gyroscope controller, comprising:
a stable oscillator for generating a substantially fixed frequency;
a driving circuit for driving at least a first portion of a plurality of electrostatic electrodes to excite a resonator at the substantially fixed frequency; and
a sensing circuit for sensing rotation of the resonator through a response from at least a second portion of the plurality of electrostatic electrodes;
wherein the substantially fixed frequency is substantially two times a natural oscillation frequency of the resonator and the resonator comprises an inertial wave resonator and the first portion of the plurality of electrostatic electrodes excite a standing wave vibration pattern in the inertial wave resonator and the response sensed from the second portion of the plurality of electrostatic electrodes is from movement of the standing wave vibration pattern.

11. The controller of claim 10, wherein operation of the gyroscope is self-disciplined requiring no digital discipline of the substantially fixed frequency.

12. The controller of claim 10, wherein operation of the gyroscope is digitally disciplined by:
comparing phase from a digital reference model referenced to the substantially fixed frequency signal; and
adjusting a bias voltage on the resonator to substantially eliminate any phase error.

13. The controller of claim 10, wherein the resonator can oscillate in any transverse direction and driving at least the first portion of the plurality of electrostatic electrodes to excite the resonator at the substantially fixed frequency comprises adjusting amplitude and phase to eliminate any damping of the resonator.

14. The controller of claim 10, wherein the inertial wave resonator comprises a disc resonator.

15. The controller of claim 10, wherein the response comprises a precession rate of the standing wave vibration pattern.

16. The controller of claim 15, wherein the precession rate of the standing wave vibration pattern is digitally disciplined to a prescribed non-zero reference value.

17. The controller of claim 16, wherein digitally disciplining the precession rate of the standing wave vibration pattern to the prescribed non-zero reference value comprises:
generating predicted sense sinusoidal components from with a digital model comprising an estimated inertial rate parameter and non-zero forcer sinusoidal component parameters to produce the prescribed non-zero reference value as the precession rate of the standing wave vibration pattern;
applying the non-zero forcer sinusoidal component parameters from the digital model to at least a third portion of the plurality of electrodes;
measuring sense component signals from at least a fourth portion of the plurality of electrodes;
comparing the predicted sense sinusoidal components with the measured sense component signals to produce a prediction error; and
updating the digital model with the prediction error to yield updates for all of the models estimated parameters including an updated inertial rate parameter.

18. The controller of claim 17, further comprising filtering the prediction error with a least mean squares (LMS) filter before updating the digital model.

19. A gyroscope controller, comprising:
means for generating a substantially fixed frequency;
means for driving at least a first portion of a plurality of electrostatic electrodes to excite a resonator at the substantially fixed frequency; and means for sensing rotation of the resonator through a response from at least a second portion of the plurality of electrostatic electrodes;

wherein the substantially fixed frequency is substantially two times a natural oscillation frequency of the resonator and the resonator comprises an inertial wave resonator and the first portion of the plurality of electrostatic electrodes excite a standing wave vibration pattern in the inertial wave resonator and the response sensed from the second portion of the plurality of electrostatic electrodes is from movement of the standing wave vibration pattern.

* * * * *